(12) United States Patent
Stuart et al.

(10) Patent No.: US 10,605,168 B2
(45) Date of Patent: Mar. 31, 2020

(54) INTERDIGITATED TURBINE ENGINE AIR BEARING COOLING STRUCTURE AND METHOD OF THERMAL MANAGEMENT

(71) Applicant: General Electric Company, Schenectady, NY (US)

(72) Inventors: Alan Roy Stuart, Cincinnati, OH (US); Jeffrey Donald Clements, Mason, OH (US); Richard Schmidt, Loveland, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 295 days.

(21) Appl. No.: 15/605,225

(22) Filed: May 25, 2017

(65) Prior Publication Data
US 2018/0340446 A1 Nov. 29, 2018

(51) Int. Cl.
*F02C 7/06* (2006.01)
*F01D 25/22* (2006.01)
(Continued)

(52) U.S. Cl.
CPC .............. *F02C 7/06* (2013.01); *F01D 5/082* (2013.01); *F01D 5/087* (2013.01); *F01D 25/16* (2013.01);
(Continued)

(58) Field of Classification Search
CPC . F01D 25/16; F01D 25/22; F01D 1/24; F01D 1/26; F01D 9/023; F01D 5/081;
(Continued)

(56) References Cited

U.S. PATENT DOCUMENTS 2,548,975 A 4/1951 Hawthorne
3,034,298 A 5/1962 White
(Continued)

FOREIGN PATENT DOCUMENTS

GB 572859 A 10/1945
GB 586569 A 3/1947

OTHER PUBLICATIONS

International Search Report and Written Opinion issued in connection with corresponding PCT Application No. PCT/US2017/064796 dated Feb. 26, 2018.

*Primary Examiner* — Gerald L Sung
*Assistant Examiner* — Stephanie Cheng
(74) *Attorney, Agent, or Firm* — Dority & Manning, P.A.

(57) ABSTRACT

The present disclosure is directed to a gas turbine engine defining a longitudinal direction, a radial direction extended from an axial centerline, and a circumferential direction. The gas turbine engine includes a compressor section, a combustion section, and a turbine section in serial flow arrangement along the longitudinal direction. The gas turbine engine includes a low speed turbine rotor including a hub extended along the longitudinal direction and radially within the combustion section; a high speed turbine rotor including a high pressure (HP) shaft coupling the high speed turbine rotor to a HP compressor in the compressor section; and a first turbine bearing disposed radially between the hub of the low speed turbine rotor and the HP shaft. The HP shaft extends along the longitudinal direction and radially within the hub of the low speed turbine rotor. The high speed turbine rotor defines a turbine cooling conduit extended within the high speed turbine rotor. The first turbine bearing defines an outer air bearing along an outer diameter of the first turbine bearing and adjacent to the hub of the low speed turbine rotor. The first turbine bearing defines an inner air bearing along an inner diameter of the first turbine bearing (Continued)

and adjacent to the HP shaft. The first turbine bearing further defines a cooling orifice adjacent along the longitudinal direction to the turbine cooling conduit of the high speed turbine rotor. The cooling orifice and the turbine cooling conduit are in fluid communication.

20 Claims, 10 Drawing Sheets

(51) Int. Cl.
    *F01D 5/08*     (2006.01)
    *F02C 7/18*     (2006.01)
    *F16C 32/06*     (2006.01)
    *F01D 25/16*     (2006.01)
    *F02C 3/067*     (2006.01)
    *F01D 1/26*     (2006.01)
    *F01D 25/12*     (2006.01)

(52) U.S. Cl.
    CPC .............. *F01D 25/22* (2013.01); *F02C 3/067* (2013.01); *F02C 7/18* (2013.01); *F16C 32/0603* (2013.01); *F16C 32/0607* (2013.01); *F16C 32/0614* (2013.01); *F16C 32/0622* (2013.01); *F16C 32/0625* (2013.01); *F01D 1/26* (2013.01); *F01D 25/125* (2013.01); *F05D 2240/53* (2013.01); *F05D 2250/44* (2013.01); *F05D 2260/205* (2013.01)

(58) Field of Classification Search
    CPC .......... F01D 5/082; F01D 5/085; F01D 5/087; F01D 5/186; F01D 5/187; F01D 5/188; F01D 5/189; F02C 3/067; F02C 7/06; F02C 7/18; F16C 32/06; F16C 32/0603; F16C 32/0607; F16C 32/0614; F16C 32/0618; F16C 32/0622; F16C 32/0625; F16C 32/0685; F16C 17/26; F16C 17/18; F05D 2240/44; F05D 2240/50; F05D 2240/51; F05D 2240/511; F05D 2240/515; F05D 2240/53; F05D 2240/81; F05D 2250/44; F05D 2220/321; F05D 2220/3212; F05D 2220/3213; F05D 2220/3215; F05D 2260/20; F05D 2260/201; F05D 2260/202; F05D 2260/203; F05D 2260/204; F05D 2260/205; F05D 2260/232; F04D 19/024; F02K 3/072

See application file for complete search history.

(56) References Cited

U.S. PATENT DOCUMENTS

| | | | |
|---|---|---|---|
| 3,903,690 A * | 9/1975 | Jones | F02C 3/067 60/39.08 |
| 4,332,427 A * | 6/1982 | Sargent | F01D 25/164 384/100 |
| 4,664,599 A | 5/1987 | Robbins et al. | |
| 4,704,862 A | 11/1987 | Dennison et al. | |
| 4,790,133 A | 12/1988 | Stuart | |
| 4,860,537 A | 8/1989 | Taylor | |
| 5,307,622 A | 5/1994 | Ciokajlo et al. | |
| 5,361,580 A | 11/1994 | Ciokajlo et al. | |
| 5,363,641 A | 11/1994 | Dixon et al. | |
| 5,443,590 A | 8/1995 | Ciokajlo et al. | |
| 6,164,656 A | 12/2000 | Frost | |
| 6,468,032 B2 * | 10/2002 | Patel | F01D 5/081 415/115 |
| 6,546,713 B1 | 4/2003 | Hidaka et al. | |
| 6,666,017 B2 | 12/2003 | Prentice et al. | |
| 6,763,652 B2 | 7/2004 | Baughman et al. | |
| 6,763,654 B2 | 7/2004 | Orlando et al. | |
| 7,185,484 B2 | 3/2007 | Griffin, III et al. | |
| 7,195,446 B2 | 3/2007 | Seda et al. | |
| 7,269,938 B2 | 9/2007 | Moniz et al. | |
| 7,290,386 B2 * | 11/2007 | Orlando | F01D 1/26 415/65 |
| 7,334,392 B2 | 2/2008 | Moniz et al. | |
| 7,451,592 B2 | 11/2008 | Taylor et al. | |
| 7,510,371 B2 | 3/2009 | Orlando et al. | |
| 7,513,102 B2 | 4/2009 | Moniz et al. | |
| 7,703,290 B2 * | 4/2010 | Bladon | F01D 3/04 415/107 |
| 8,365,510 B2 | 2/2013 | Lugg | |
| 8,667,775 B1 | 3/2014 | Kisska et al. | |
| 9,103,227 B2 | 8/2015 | Kupratis et al. | |
| 9,494,077 B2 | 11/2016 | Chanez et al. | |
| 9,657,594 B2 * | 5/2017 | Klusman | F04D 29/057 |
| 9,670,839 B2 | 6/2017 | Lee et al. | |
| 2004/0055276 A1 | 3/2004 | Lewis et al. | |
| 2004/0060279 A1 | 4/2004 | Joseph et al. | |
| 2005/0241292 A1 | 11/2005 | Taylor et al. | |
| 2006/0032210 A1 | 2/2006 | Griffin, III et al. | |
| 2006/0090451 A1 | 5/2006 | Moniz et al. | |
| 2006/0093464 A1 | 5/2006 | Moniz et al. | |
| 2006/0093467 A1 | 5/2006 | Orlando et al. | |
| 2006/0093469 A1 | 5/2006 | Moniz et al. | |
| 2006/0272314 A1 | 12/2006 | Moniz et al. | |
| 2006/0275111 A1 | 12/2006 | Orlando et al. | |
| 2008/0184694 A1 | 8/2008 | Guimbard et al. | |
| 2010/0089019 A1 | 4/2010 | Knight et al. | |
| 2014/0290209 A1 | 10/2014 | Lee et al. | |
| 2015/0226075 A1 | 8/2015 | Aoki et al. | |
| 2016/0069260 A1 | 3/2016 | Speak et al. | |
| 2016/0102607 A1 | 4/2016 | Hiernaux | |
| 2018/0209335 A1 | 7/2018 | Stuart et al. | |
| 2018/0209336 A1 | 7/2018 | Stuart et al. | |
| 2018/0340423 A1 | 11/2018 | Stuart et al. | |
| 2018/0340469 A1 | 11/2018 | Stuart et al. | |
| 2018/0340470 A1 | 11/2018 | Stuart et al. | |

* cited by examiner

INTERDIGITATED TURBINE ENGINE AIR BEARING COOLING STRUCTURE AND METHOD OF THERMAL MANAGEMENT

FIELD

The present subject matter relates generally to gas turbine engine architecture. More particularly, the present subject matter relates to a bearing arrangement and thermal management system for gas turbine engine turbine sections.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Conventional gas turbine engines generally include turbine sections defining a high pressure turbine in serial flow arrangement with an intermediate pressure turbine and/or low pressure turbine. The high pressure turbine includes an inlet or nozzle guide vane between the combustion section and the high pressure turbine rotor. Conventionally, combustion gases exiting the combustion section define a relatively low velocity compared to a velocity (e.g., along a circumferential or tangential direction) of the first rotating stage of the turbine, generally defined as the high pressure turbine rotor. Thus, conventionally, the nozzle guide vane serves to accelerate a flow of combustion gases exiting the combustion section to more closely match or exceed the high pressure turbine rotor speed along a tangential or circumferential direction. Such acceleration of flow using a nozzle guide vane to match or exceed high pressure turbine rotor speed is known to improve general engine operability and performance.

Thereafter, conventional gas turbine engine turbine sections generally include successive rows or stages of stationary and rotating airfoils, or vanes and blades, respectively. This conventional configuration generally conditions a flow of the combustion gases entering and exiting each stage of vanes and blades. However, conventional turbine sections, and especially stationary airfoils (i.e. vanes and nozzle guide vanes) require considerable quantities and masses of cooling air to mitigate damage due to hot combustion gases. For example, generally, nozzle guide vanes are designed to withstand a maximum combustion gas temperature along an annulus (i.e. hot spots), which may be significantly larger than an average combustion gas temperature along the annulus. Thus, conventional engines are designed to use significant quantities or masses of cooling air from a compressor section or unburned air from the combustion section to mitigate structural damage, wear, deterioration, and ultimately, maintenance and repair, of the nozzle guide vanes. However, this cooling air adversely affects overall engine efficiency, performance, fuel consumption, and/or operability by removing energy that could otherwise be used in combustion to drive the turbines, compressors, and fan. Still further, the nozzle guide vane is often a limiting component when determining maintenance and repair intervals for gas turbine engines, thereby limiting overall engine performance and efficiency.

A known solution to improve turbine section efficiency is to interdigitate the rotors of the turbine section (i.e. successive rows or stages of rotating airfoils or blades). For example, a known solution is to configure a turbine section, in serial flow arrangement from an upstream end to a downstream end along a longitudinal direction, with a nozzle guide vane, a high pressure turbine rotor, another turbine vane stage (i.e. stationary airfoils), and an intermediate pressure turbine interdigitated with a low pressure turbine. Another known solution is to configure a turbine section, in serial flow arrangement, with a nozzle guide vane, a high pressure turbine rotor, and various levels of interdigitated rotors thereafter, including low, intermediate, or high pressure turbine rotors.

However, despite various known solutions, there exists a need structures that enable further interdigitation of the turbine section toward the combustion section. Still further, there exists a need for methods of arranging and operating turbine section bearings that enable efficient use of compressed air for bearing operation and engine cooling.

BRIEF DESCRIPTION

Aspects and advantages of the invention will be set forth in part in the following description, or may be obvious from the description, or may be learned through practice of the invention.

The present disclosure is directed to a gas turbine engine defining a longitudinal direction, a radial direction extended from an axial centerline, and a circumferential direction. The gas turbine engine includes a compressor section, a combustion section, and a turbine section in serial flow arrangement along the longitudinal direction. The gas turbine engine includes a low speed turbine rotor including a hub extended along the longitudinal direction and radially within the combustion section; a high speed turbine rotor including a high pressure (HP) shaft coupling the high speed turbine rotor to a HP compressor in the compressor section; and a first turbine bearing disposed radially between the hub of the low speed turbine rotor and the HP shaft. The HP shaft extends along the longitudinal direction and radially within the hub of the low speed turbine rotor. The high speed turbine rotor defines a turbine cooling conduit extended within the high speed turbine rotor. The first turbine bearing defines an outer air bearing along an outer diameter of the first turbine bearing and adjacent to the hub of the low speed turbine rotor. The first turbine bearing defines an inner air bearing along an inner diameter of the first turbine bearing and adjacent to the HP shaft. The first turbine bearing further defines a cooling orifice adjacent along the longitudinal direction to the turbine cooling conduit of the high speed turbine rotor. The cooling orifice and the turbine cooling conduit are in fluid communication.

In one embodiment, the cooling orifice defines a nozzle configured to accelerate a flow of air from the first turbine bearing to the turbine cooling conduit of the high speed turbine rotor.

In another embodiment, the cooling orifice defines a plurality of vanes configured to accelerate a flow of air along the longitudinal and circumferential directions, and the acceleration along the circumferential direction is along the same direction of rotation as the high speed turbine rotor.

In various embodiments, the combustion section defines a pressure plenum downstream of the compressor section, and wherein the engine further comprises a first manifold extended from and in fluid communication with the pressure plenum to the first turbine bearing. In one embodiment, the gas turbine engine includes a second manifold extended from the first turbine bearing in fluid communication with a pressure regulating valve. In another embodiment, the engine further includes a third manifold extended from the pressure plenum to a pressure regulating valve, in which the pressure plenum and the pressure regulating valve are in fluid communication via the third manifold.

In various embodiments, the engine further includes a fourth manifold extended from the pressure plenum to the first turbine bearing, the fourth manifold independently operable from the first manifold. In one embodiment, the fourth manifold, the cooling orifice, and the turbine cooling conduit are together in fluid communication.

In one embodiment, the first turbine bearing includes an outer plurality of orifices arranged at least along the longitudinal direction and circumferentially along the outer air bearing. The outer plurality of orifices is adjacent to the hub of the low speed turbine rotor. The first turbine bearing includes an inner plurality of orifices arranged at least along the longitudinal direction and circumferentially along the inner air bearing, in which the inner plurality of orifices is adjacent to the high speed turbine rotor.

In another embodiment, the first turbine bearing defines an at least partially annular groove at an outer diameter of the first turbine bearing, in which the groove is radially adjacent to the hub of the low speed turbine rotor.

In yet another embodiment, the engine defines a compressor seal interface between the HP compressor and the first turbine bearing, in which the engine defines a first cavity extended at least partially circumferentially around the axial centerline of the engine.

In still another embodiment, the engine defines a turbine seal interface between the high speed turbine rotor and the first turbine bearing, in which the engine defines a second cavity extended at least partially circumferentially around the axial centerline of the engine.

The present disclosure is further directed to a method of operating a gas turbine engine, in which the engine includes a first turbine bearing defining an outer air bearing disposed radially adjacent to a low speed turbine rotor hub of a low speed turbine rotor and an inner bearing disposed radially adjacent to a high pressure (HP) shaft coupled to a high speed turbine rotor, wherein a first manifold is in fluid communication from a pressure plenum of a combustion section to the first turbine bearing, and wherein a second manifold is in fluid communication from the first turbine bearing to a pressure regulating valve, and wherein a third manifold is in fluid communication from the pressure plenum of the combustion section to the pressure regulating valve, and wherein a fourth manifold is in fluid communication from the pressure plenum of the combustion section to the turbine cooling conduit of the high speed turbine rotor. The method includes flowing air from the pressure plenum to the first turbine bearing; flowing air between the outer air bearing and the low speed turbine rotor hub; flowing air between the inner air bearing and the HP shaft; flowing air from the first turbine bearing to the pressure regulating valve via the second manifold; and flowing air from the first turbine bearing through a turbine cooling circuit of the high speed turbine rotor.

In one embodiment, the method further includes flowing air from the pressure plenum of the combustion section to the pressure regulating valve via the third manifold.

In another embodiment, flowing air from the first turbine bearing through the turbine cooling circuit includes flowing air through the fourth manifold independent of the first manifold.

In yet another embodiment, the method further includes modulating the flow of air from the first turbine bearing through the turbine cooling circuit of the high speed turbine rotor.

In still another embodiment, the method further includes flowing air from between the outer air bearing and the low speed turbine rotor hub to the core flowpath of the turbine section.

In various embodiments, the method further includes providing a first supply of air from between the outer air bearing and the low speed turbine rotor hub; providing a second supply of air from between the inner air bearing and the HP shaft; and flowing the first supply of air and the second supply of air through the second manifold to the pressure regulating valve. In one embodiment, the method further includes monitoring a difference in air pressure from the second manifold and the third manifold. In another embodiment, monitoring a difference in air pressure from the second manifold and the third manifold includes monitoring a difference in pressure from the pressure plenum and pressure from the first supply of air and the second supply of air from the first turbine bearing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
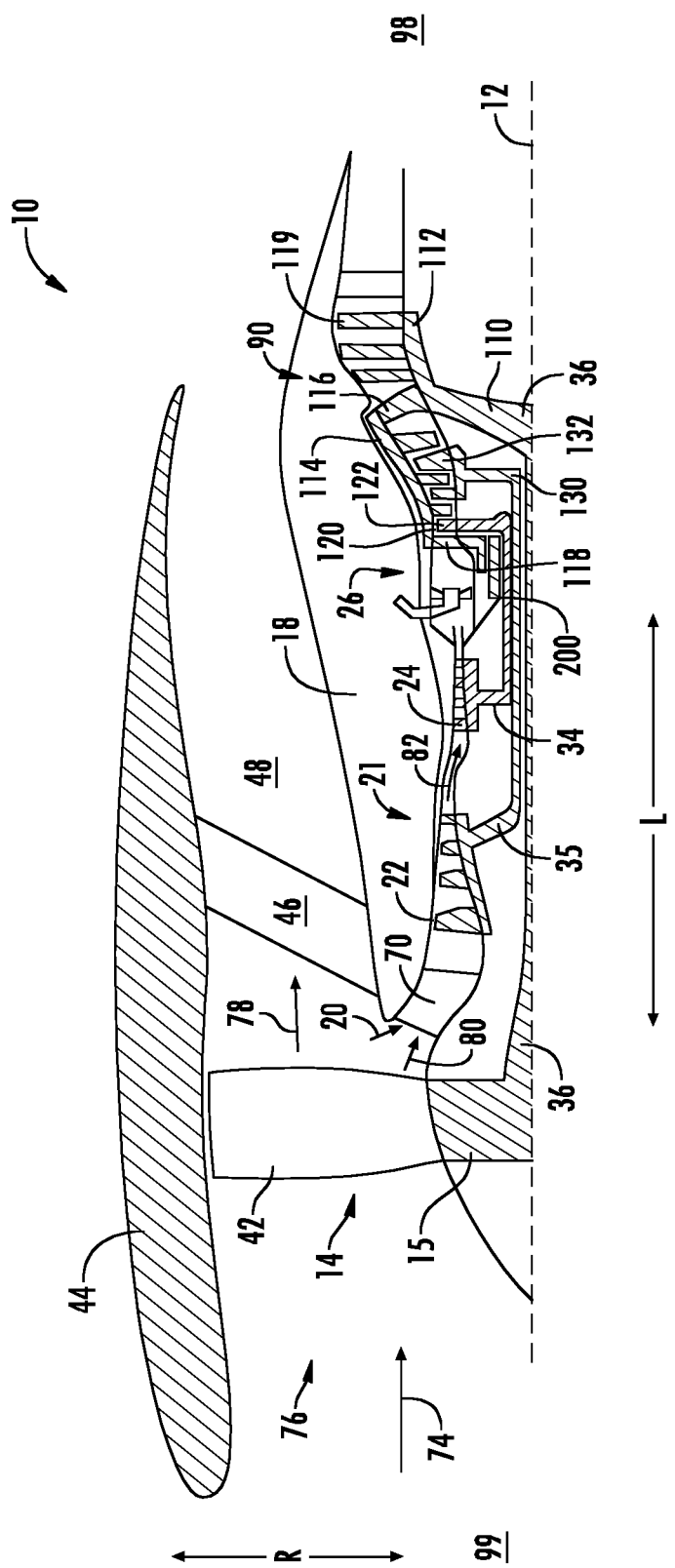
FIG. 1 is a schematic cross sectional view of an exemplary gas turbine engine incorporating an exemplary embodiment of a turbine section according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "low", "intermediate", "high", or their respective comparative degrees (e.g. —er, where applicable) each refer to relative speeds within an engine unless otherwise specified. For example, a "low turbine" or "low speed turbine" defines a rotational speed lower than a "high turbine" or "high speed turbine". Alternatively, unless otherwise specified, the aforementioned terms may be understood in their superlative degree. For example, a "low turbine" may refer to the lowest rotational speed turbine within a turbine section, and a "high turbine" may refer to the highest rotational speed turbine within the turbine section.

Exemplary embodiments of a first turbine bearing for an interdigitated turbine section are generally provided as well as methods of operation and thermal management. The first turbine bearing defines an outer air bearing disposed adjacent to a low speed turbine rotor and an inner air bearing disposed adjacent to a high speed turbine rotor. The low speed turbine rotor generally defines a low speed turbine rotor interdigitated forward of and among rows of the high speed turbine rotor defining a high speed turbine rotor. In various embodiments, the first turbine bearing, and methods of operation thereof, include providing cooling to the high speed turbine rotor and/or an outer diameter (OD) secondary flowpath of the turbine section.

The embodiments of the gas turbine engine including the first turbine bearing, and methods of operation thereof, may enable efficient use of cooling air for operation of the first turbine bearing and turbine section, thereby improving overall gas turbine efficiency and/or reducing fuel consumption. The embodiments of the gas turbine engine with interdigitated turbine section shown and described herein may further enable additional stages of interdigitation of the low speed turbine rotor and the high speed turbine rotor, up to and including one or more stages of the low speed turbine rotor forward or upstream of the high speed turbine rotor. In various embodiments, the gas turbine engine with interdigitated turbine section may further reduce cooling air consumption, increase engine efficiency, performance, and/or operability, and/or reduce part quantities, weight, and/or packaging (i.e. axial and/or radial dimensions). Still further, the interdigitated turbine section may reduce a product of axial flow area and the square of the rotational speed (the product referred to as "$AN^2$") while additionally reducing an average work factor per stage of the turbine section.

Referring now to the drawings, FIG. 1 is a schematic cross sectional view of an exemplary gas turbine engine 10 (herein referred to as "engine 10"), shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. Still further, although described below as a three-spool gas turbine engine, the present disclosure is also applicable to two-spool gas turbine engines. As shown in FIG. 1, the engine 10 has a longitudinal or axial centerline axis 12 that extends there through for reference purposes. The engine 10 defines a longitudinal direction L, a radial direction R, and an upstream end 99 and a downstream end 98 along the longitudinal direction L.

In general, the engine 10 may include a substantially tubular outer casing 18 that defines an annular inlet 20. The outer casing 18 encases or at least partially flows, in serial flow arrangement, a compressor section 21, a combustion section 26, and an interdigitated turbine section 90 (herein referred to as "turbine section 90"). Generally, the engine 10 defines, in serial flow arrangement from the upstream end 99 to the downstream end 98, the fan assembly 14, the compressor section 21, the combustion section 26, and the turbine section 90. In the embodiment shown in FIG. 1, the compressor section 21 defines a high pressure (HP) compressor 24 and an intermediate pressure (IP) compressor 22. In other embodiments, the fan assembly 14 may further include or define one or more stages of a plurality of fan blades 42 that are coupled to and extend outwardly in the radial direction R from a fan rotor 15 and/or a low speed shaft 36. In various embodiments, multiple stages of the plurality of fan blades 42 coupled to the low speed shaft 36 may be referred to as a low pressure (LP) compressor.

An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

Figure 2:
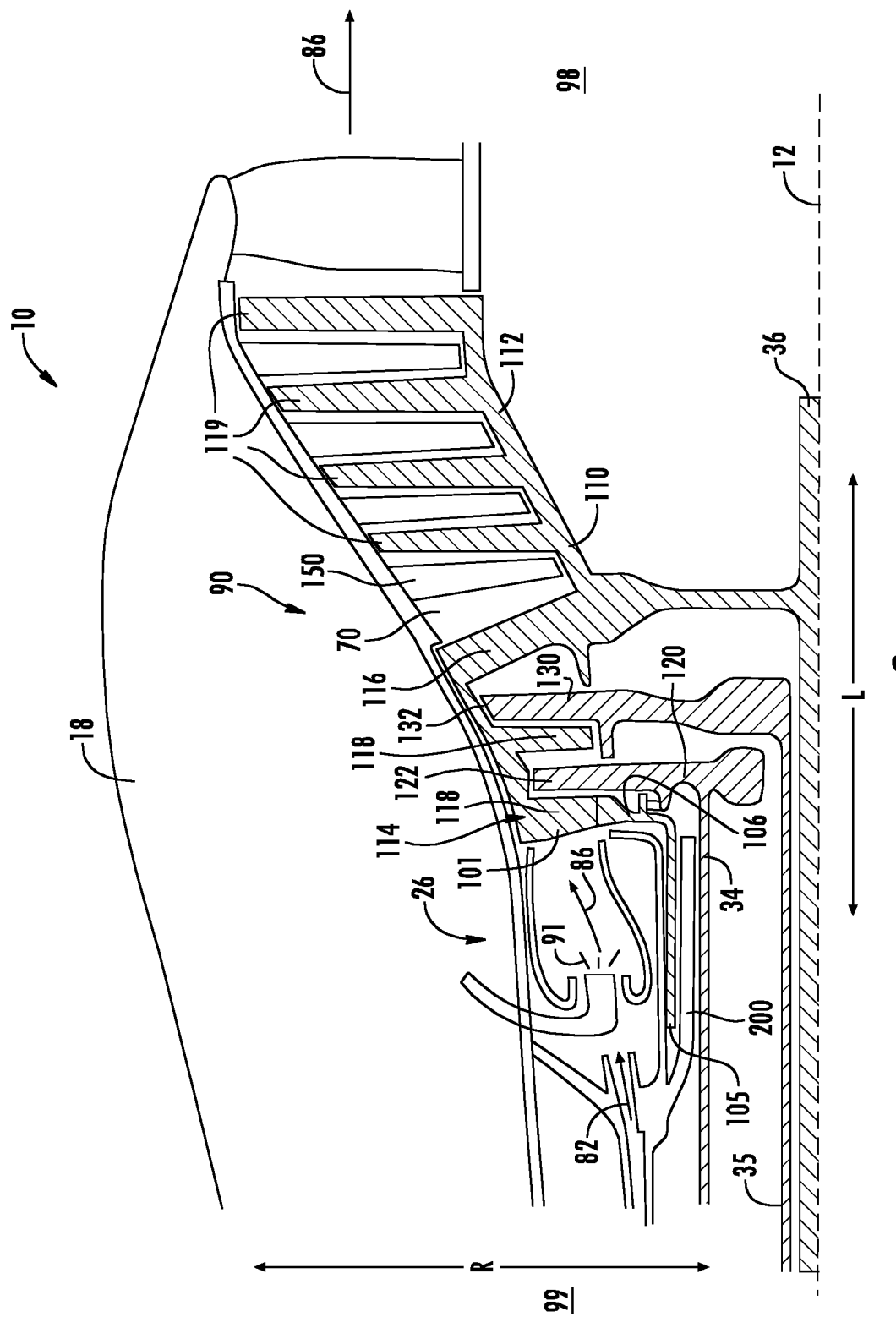
FIG. 2 is a schematic cross sectional view of an embodiment of a combustion section and turbine section of the engine shown in FIG. 1 including an embodiment of a first turbine bearing supporting the turbine section.

Referring now to FIG. 2, an exemplary embodiment of the turbine section 90 of the engine 10 is generally provided. The turbine section 90 includes a low speed turbine rotor 110 extended along the longitudinal direction L. The low speed turbine rotor 110 includes an inner shroud 112, an outer shroud 114, and at least one connecting airfoil 116 coupling the inner shroud 112 to the outer shroud 114. The outer shroud 114 includes a plurality of outer shroud airfoils 118 extended inward along the radial direction R. In various embodiments, the inner shroud 112 may include a plurality of inner shroud airfoils 119 extended outward along the radial direction R.

The inner shroud 112 and the outer shroud 114 each extend generally along the longitudinal direction L. The inner shroud 112 and/or the outer shroud 114 may each extend at least partially in the radial direction R. In various embodiments, the inner shroud 112 extends from the connecting airfoil 116. In one embodiment, the inner shroud 112 further extends toward the downstream end 98 along the longitudinal direction L. In still various embodiments, the outer shroud 114 extends from the connecting airfoil 116 toward the upstream end 99 along the longitudinal direction L toward the combustion section 26.

Figure 4:
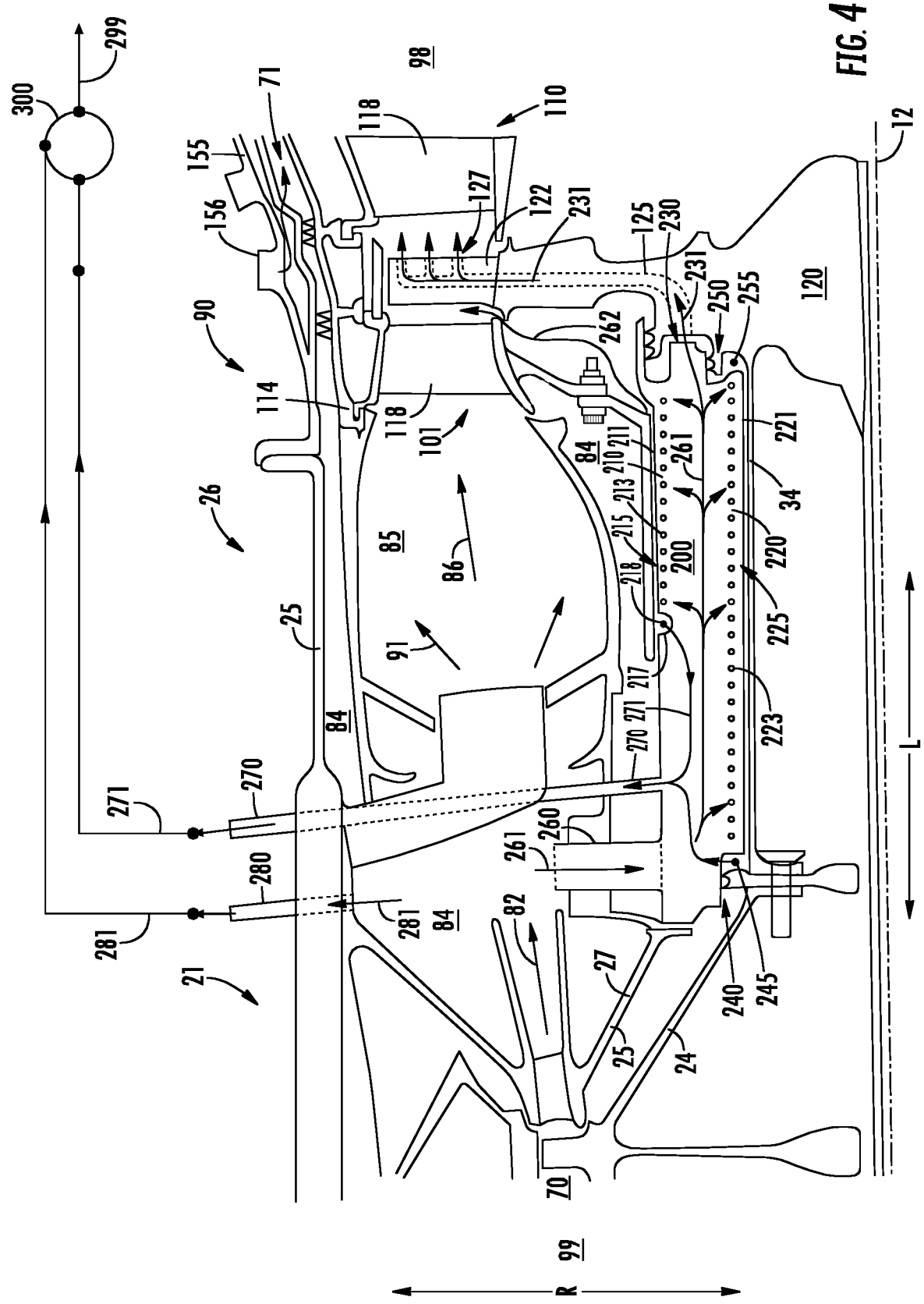
FIG. 4 is a schematic cross sectional view of another embodiment of the engine including a first turbine bearing supporting the turbine section shown in FIGS. 1-2.

As shown on FIG. 4, a turbine casing 155 extends generally extended from the combustion section 26 along the longitudinal direction L and circumferentially encompassing the turbine section 90. The turbine casing 155 may define an outer diameter (OD) secondary flowpath 71 radially between the outer shroud 114 of the low speed turbine rotor 110 and the turbine casing 155. The turbine casing 155 may include a plurality of orifices 156 through which a fluid may ingress or egress to the secondary flowpath 71 and/or core flowpath 70.

Referring now to FIG. 2, the turbine section 90 further includes a high speed turbine rotor 120 and an intermediate speed turbine rotor 130 each disposed forward or upstream 99 of the one or more connecting airfoils 116 of the low speed turbine rotor 110. The high speed turbine rotor 120 includes a plurality of high speed turbine airfoils 122 extended outward along the radial direction R. The intermediate speed turbine rotor 130 includes a plurality of intermediate speed turbine airfoils 132 extended outward along the radial direction R. The pluralities of high speed turbine airfoils 122 and intermediate speed turbine airfoils 132 are each disposed among the pluralities of outer shroud airfoils 118 of the low speed turbine rotor 110 along the longitudinal direction L.

In various embodiments, the low speed turbine rotor 110 defines a plurality of stages of rotating airfoils, such as the plurality of outer shroud airfoils 118 disposed along the longitudinal direction L, the one or more connecting airfoils 116, and/or the plurality of inner shroud airfoils 119 disposed along the longitudinal direction L. In one embodiment, the low speed turbine rotor 110 defines at least one stage forward or upstream 99 of the high speed turbine rotor 120. In another embodiment, the turbine section 90 defines a first stage of airfoils in which the first stage includes the plurality of outer shroud airfoils 118 of the low speed turbine rotor 110 forward or upstream 99 of each stage of the high speed turbine rotor 120.

In still various embodiments, such as shown in FIG. 2, the engine 10 defines, in serial flow arrangement along the longitudinal direction L from the upstream end 99 to the downstream end 98, the plurality of outer shroud airfoils 118 of the low speed turbine rotor 110, the plurality of high speed turbine airfoils 122 of the high speed turbine rotor 120, and the plurality of outer shroud airfoils 118 of the low speed turbine rotor 110. In still various embodiments, additional iterations of interdigitation of the low speed turbine rotor 110 and the high speed turbine rotor 120 may be defined forward or upstream 99 of the connecting airfoils 116.

In yet various embodiments, such as shown in FIG. 2, the engine 10 further defines two or more stages of the low speed turbine rotor 110 and one or more stages of the intermediate speed turbine rotor 130 in interdigitation along the longitudinal direction L downstream of the high speed turbine rotor 120. For example, the engine 10 may define, in serial flow arrangement along the longitudinal direction L from the upstream end 99 to the downstream end 98, the combustion section 26, the first stage 101 of the low speed turbine rotor 110, the high speed turbine rotor 120, the low speed turbine rotor 110, the intermediate speed turbine rotor 130, and the low speed turbine rotor 110. In one embodiment, the engine 10 may further define additional stages of interdigitation of the high speed turbine rotor 120 and/or the intermediate speed turbine rotor 130 in interdigitation (i.e. alternating arrangement along the longitudinal direction L) with the low speed turbine rotor 110.

As another non-limiting example, as shown in FIG. 2, the engine 10 may further define the serial flow arrangement of the plurality of outer shroud airfoils 118, the plurality of high speed turbine airfoils 122, the plurality of outer shroud airfoils 118, the plurality of intermediate speed turbine airfoils 132, the plurality of outer shroud airfoils 118, an additional plurality of intermediate speed turbine airfoils 132, and the connecting airfoils 116. It should be appreciated that although FIG. 2 shows the high speed turbine rotor 120 as defining one stage, the high speed turbine rotor 120 may define generally one or more stages between the first stage 101 of the low speed turbine rotor 110 and the connecting airfoils 116 of the low speed turbine rotor 110, and interdigitated therebetween along the longitudinal direction L. Similarly, it should be appreciated that although FIG. 1 shows the intermediate speed turbine rotor 130 as defining two stages, the intermediate speed turbine rotor 130 may define generally one or more stages between the high speed turbine rotor 120 and the connecting airfoils 116 of the low speed turbine rotor 110.

Referring now to FIGS. 1-7, in various embodiments, the low speed turbine rotor 110 is drivingly connected and rotatable with a low speed shaft 36 extended along the longitudinal direction L and generally concentric about the axial centerline 12. In one embodiment, as shown in FIG. 1, the low speed shaft 36 is connected to the fan assembly 14, of which is driven in rotation by the low speed turbine rotor 110 of the turbine section 90. The low speed shaft 36 is connected to the fan rotor 15 of the fan assembly 14. In various embodiments, the fan assembly 14 may define a plurality of stages of the plurality of fan blades 42, of which further define the LPC.

In various embodiments, the intermediate speed turbine rotor 130 is drivingly connected and rotatable with an intermediate speed shaft 35 extended along the longitudinal direction L and generally concentric about the axial centerline 12. In one embodiment, as shown in FIG. 1, the intermediate speed shaft 35 is connected to the IP compressor 22, of which is driven in rotation by the intermediate speed turbine rotor 130 of the turbine section 90.

Referring still to FIGS. 1-7, the high speed turbine rotor 120 of the turbine section 90 is drivingly connected and rotatable with a HP shaft 34 extended along the longitudinal direction L and generally concentric about the axial centerline 12. The HP shaft 34 is connected to the HP compressor 24, of which is driven in rotation by the high speed turbine rotor 120 of the turbine section 90.

Referring to FIG. 2, the turbine section 90 further includes one or more turbine vanes 150. The turbine vane 150 may define a plurality of stationary airfoils (i.e. vanes) in circumferential arrangement. In one embodiment, the turbine vane 150 is disposed between the pluralities of inner shroud airfoils 119 along the longitudinal direction L. In various embodiments, the turbine vane 150 is disposed downstream 98 of the connecting airfoil 116 of the low speed turbine rotor 110. The turbine vane 150, or pluralities thereof, interdigitated among the pluralities of inner shroud airfoils 119 may enable further conditioning of the combustion gases 86 and work or energy extraction from the low speed turbine rotor 110 via the plurality of inner shroud airfoils 119.

During operation of the engine 10 as shown collectively in FIGS. 1-7, the high speed turbine rotor 120 rotates generally at a higher rotational speed than the intermediate speed turbine rotor 130. The intermediate speed turbine rotor 130 rotates generally at a higher speed than the low speed turbine rotor 110. During operation of the engine 10, a volume of air as indicated schematically by arrows 74 enters the engine 10 through an associated inlet 76 of the nacelle and/or fan assembly 14. As the air 74 passes across the fan blades 42, a portion of the air as indicated schematically by arrows 78 is directed or routed into the bypass airflow passage 48 while another portion of the air as indicated schematically by arrows 80 is directed or through the fan assembly 14. Air 80 is progressively compressed as it flows through the compressor section 21 toward the combustion section 26.

The now compressed air, as indicated schematically by arrows 82, flows into the combustion section 26 where a fuel 91 is introduced, mixed with at least a portion of the compressed air 82, and ignited to form combustion gases 86. The combustion gases 86 flow into the turbine section 90, causing rotary members of the turbine section 90 to rotate and support operation of respectively coupled rotary members in the compressor section 21 and/or fan assembly 14.

In various embodiments, the low speed turbine rotor 110, and the low speed shaft 36 to which it is attached, rotates in a first direction along the circumferential direction. The high speed turbine rotor 120, and the HP shaft 34 to which it is attached, rotates in a second direction opposite of the first direction along the circumferential direction. In one embodiment, the intermediate speed turbine rotor 130, and the intermediate speed shaft 35 to which it is attached, rotates in the second direction in co-rotation with the high speed turbine rotor 120 and in counter-rotation with the low speed turbine rotor 110.

It should further be understood that the first direction and the second direction as used and described herein are intended to denote directions relative to one another. Therefore, the first direction may refer to a clockwise rotation (viewed from downstream looking upstream) and the second direction may refer to a counter-clockwise rotation (viewed from downstream looking upstream). Alternatively, the first direction may refer to a counter-clockwise rotation (viewed from downstream looking upstream) and the second direction may refer to a clockwise rotation (viewed from downstream looking upstream).

Still further during an operation of the engine 10, combustion gases 86 exiting the combustion section 26 define a generally low speed toward the downstream end 98 of the engine 10. A low speed rotation (e.g. along a tangential or circumferential direction) of the first stage 101 of the low speed turbine rotor 110 accelerates a speed of the combustion gases 86, such as in the tangential or circumferential direction, to approximately equal or greater than a speed of the high speed turbine rotor 120.

By defining the low speed turbine rotor 110 as the first stage 101 of the turbine section 90 aft or downstream of the combustion section 26, the engine 10 may obviate the need for a first turbine vane or nozzle guide vane to accelerate the combustion gases 86 forward or upstream of the high speed turbine rotor 120 defining a high speed turbine. As such, the engine 10 may reduce a quantity or mass of cooling air from the compressor section 21 and/or combustion section 26, thereby increasing engine efficiency by enabling more energy (i.e. compressed air) to be used during combustion. Additionally, or alternatively, the turbine section 90 may reduce necessary cooling air and enable increased performance and/or operability of the compressor section 21, including surge margin and/or efficiency, or decrease a required amount of work from the compressor section 21, which may reduce axial dimensions or stages of the compressor section 21 and further reduce engine packaging, weight, and/or part count, and generally improve engine 10 performance.

Additionally, obviating the need for the first turbine vane or nozzle guide vane may enable the turbine section 90, or more specifically, the first stage 101, as a rotating stage, to be designed to an average combustion gas 86 temperature rather than designed to accommodate peak temperatures (i.e. high spots) along an annulus of the core flowpath 70 within the combustion section 26. Therefore, as all of the plurality of outer shroud airfoils 118 of the first stage 101 are rotating, all of the plurality of outer shroud airfoils 118 may only transiently endure adverse effects of combustion hot spots rather than substantially sustained or constant exposure to a higher temperature from the combustion gases in contrast to other locations about the annulus of the core flowpath 70. Still further, the turbine section 90 described herein may enable alternative design methods for the combustion section 26 due to a decreased adverse effect of combustion hot spots on the turbine section 90. Therefore, the turbine section 90 may enable design of the combustion section 26 to further improve combustion stability, decrease emissions, increase operability across all or part of a flight envelope, increase altitude re-light performance, and/or decrease lean blowout (LBO).

Figure 3:
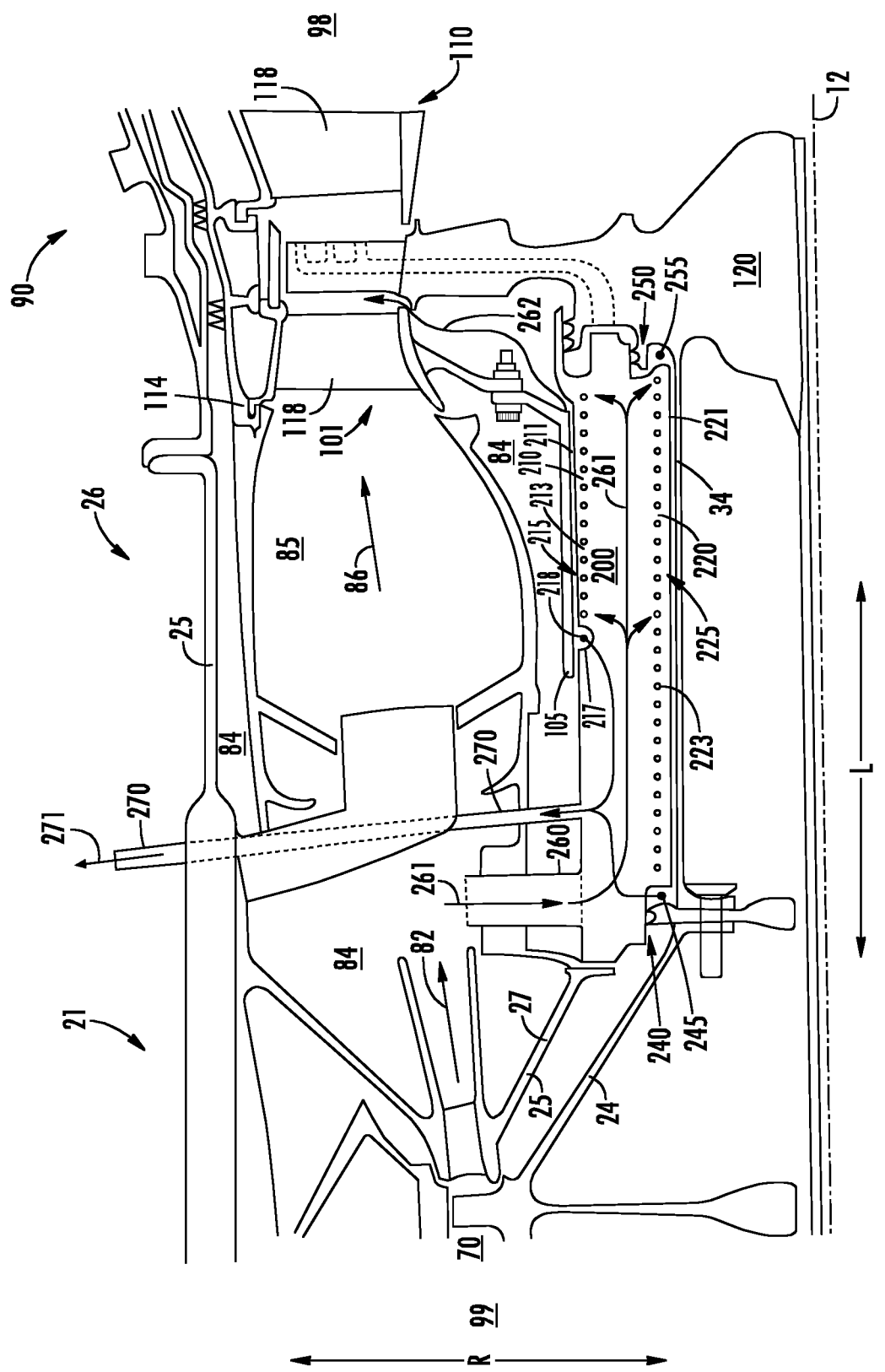
FIG. 3 is a schematic cross sectional view of an embodiment of the engine including a first turbine bearing supporting the turbine section shown in FIGS. 1-2.

Referring now to FIG. 3, a detailed schematic cross sectional view of the engine 10 including a first turbine bearing 200 supporting the low speed turbine rotor 110 and the high speed turbine rotor 120 is generally provided. The first turbine bearing 200 is disposed radially between the hub 105 of the low speed turbine rotor 110 and the HP shaft 34 coupled to the high speed turbine rotor 120. The first turbine bearing 200 defines an outer air bearing 210 along an outer diameter 215 of the first turbine bearing 200 and adjacent to the hub 105 of the low speed turbine rotor 110. The first turbine bearing 200 further defines an inner air bearing 220 along an inner diameter 225 and adjacent to the HP shaft 34 coupled to the high speed turbine rotor 120.

In various embodiments, the first turbine bearing 200 includes an outer annular wall 211 at the outer diameter 215 of the outer air bearing 210 and an inner annular wall 221 at the inner diameter 225 of the inner air bearing 220. Each of the outer and inner annular walls 211, 221 extend circumferentially around the axial centerline 12 of the engine 10 and are generally concentric to the axial centerline 12. The outer annular wall 211 and inner annular wall 221 each extend at least partially along the longitudinal direction L. The first turbine bearing 200 further includes an outer plurality of orifices 213 arranged at least along the longitudinal direction L and circumferentially along the outer air bearing 210. The outer plurality of orifices 213 is adjacent to the hub 105 of the low speed turbine rotor 110. The first turbine bearing 200 still further includes an inner plurality of orifices 223 arranged at least along the longitudinal direction L and circumferentially along the inner air bearing 220. The inner plurality of orifices 223 is adjacent to the HP shaft 34 coupled to the high speed turbine rotor 120.

In various embodiments, the outer air bearing 210 and/or the inner air bearing 220 may be formed of a plurality of segments arranged substantially in circumferential arrangement about the axial centerline 12 of the engine 10 to together define an approximately 360 degree annular surface, such as the outer annular wall 211 and/or the inner annular wall 221.

Referring to FIG. 3, the combustion section 26 includes a compressor/diffuser frame 25 generally surrounding a combustor assembly and defining a pressure plenum 84. The compressor/diffuser frame 25 generally defines a pressure vessel defining the annular pressure plenum 84 downstream of an exit of the HP compressor 24 and generally upstream of and/or radially surrounding the combustion chamber 85 at which the compressed air 82 substantially defines a compressor exit pressure. The compressor/diffuser frame 25 generally includes an inner diffuser frame 27 generally annular and radially inward within the combustion section 26. The inner diffuser frame 27 generally extends from the compressor section 21 toward the turbine section 90, supporting the first turbine bearing 200 and a combustor assembly. The first turbine bearing 200 is coupled to and cantilevered from the inner diffuser frame 27 toward the turbine section 90.

In various embodiments, the first turbine bearing 200 defines an at least partially annular groove 217 at the outer diameter 215 of the outer annular wall 211 of the outer air bearing 210. The groove 217 is disposed radially adjacent to the hub 105 of the low speed turbine rotor 110. In various embodiments, the groove 217 is defined proximate to an upstream end of the hub 105 of the low speed turbine rotor 110. For example, the groove 217 may be defined on the outer air bearing 210 radially adjacent to within 50% of the longitudinal span of the hub 105 from the upstream end of the hub 105 (i.e., from the end of the hub 105 most proximate to the upstream end 99 of the engine 10). As another example, the groove 217 may be defined on the outer annular wall 211 of the first turbine bearing 200 adjacent along the radial direction R within 30% of the span of the hub 105 along the longitudinal direction L proximate to the upstream end 99 of the engine 10.

In one embodiment, the engine 10 further defines a compressor seal interface 240 between the HP compressor 24 and the first turbine bearing 200. Between the compressor seal interface 240 and the first turbine bearing 200, the engine 10 defines a first cavity 245 extended at least partially circumferentially around the axial centerline 12 of the engine 10. The engine 10 further defines a turbine seal interface 250 between the high speed turbine rotor 120 and the first turbine bearing. Between the turbine seal interface 250 and the first turbine bearing 200, the engine 10 defines a second cavity 255 extended at least partially circumferentially around the axial centerline 12 of the engine 10. The seal interfaces 240, 250 may each include a combination of a shroud and knife edge or labyrinth seal to define each seal interface 240, 250.

The engine 10 may further include a first manifold 260 extended from the pressure plenum 84 to the first turbine bearing 200 and in fluid communication therebetween. The compressed air 82 from the compressor section 21 may flow from the pressure plenum 84 through the first manifold 260 into the first turbine bearing 200 as shown schematically by arrows 261. The air 261 through the first turbine bearing 200 flows to and egresses through the first and second plurality of orifices 213, 223 at the outer air bearing 210 and the inner air bearing 220 of the first turbine bearing 200.

The first turbine bearing 200 generally defines a hydrostatic air bearing through which the compressed air 261 egresses through the first and second plurality of orifices 213, 223 to define a separating fluid film between the rotating components. At the outer air bearing 210 of the first turbine bearing 200, the compressed air 261 defines a fluid film between the outer annular wall 211 and the hub 105 of the low speed turbine rotor 110. At the inner air bearing 220 of the first turbine bearing 200, the compressed air 261 defines a fluid film between the inner annular wall 221 and the HP shaft 34 coupled to the high speed turbine rotor 120. The pressurized air from the compressor section 21 and in the pressure plenum 84 at least partially defines or determines an amount of clearance or distance between the hub 105 of the low speed turbine rotor 110 and the first turbine bearing 200, and between the HP shaft 34 of the high speed turbine rotor 120 and the first turbine bearing 200.

Referring now to FIG. 4, the first turbine bearing 200 shown and described in regard to FIG. 3 may further define a cooling orifice 230 axially adjacent to the high speed turbine rotor 120 through which a portion of the compressed air 261 within the first turbine bearing 200 may egress into the high speed turbine rotor 120 to provide thermal attenuation or cooling, such as shown schematically by arrows 231. In various embodiments, the high speed turbine rotor 120 defines a turbine cooling circuit 125 extended therethrough at least partially along the longitudinal direction L and radial direction R. The turbine cooling circuit 125 is defined generally within the structure or walls of a rotor, hub, or disk of the high speed turbine rotor 120. The turbine cooling circuit 125 may further be defined within the structure of the high speed turbine airfoils 122. The turbine cooling circuit 125 may define one or more cooling circuit egresses 127 at the high speed turbine airfoils 122, through which the compressed air 231 egresses the high speed turbine rotor 120 into the core flowpath 70 at the turbine section 90.

In various embodiments, the cooling orifice 230 of the first turbine bearing 200 defines a nozzle to increase a speed of and/or direct a flow of air 231 to the cooling circuit 125 of the high speed turbine rotor 120. For example, the cooling orifice 230 may define a plurality of vanes defining a pressure side, a suction side, a leading edge, and a trailing edge, across which the compressed air 231 accelerates a flow of the air 231 along the longitudinal direction L and/or along the circumferential direction to approximately match the rotational speed of the high speed turbine rotor 120. In various embodiments, the plurality of vanes defined within the cooling orifice 230 may further accelerate the flow of air 231 along the same direction of rotation as the high speed turbine rotor 120 (i.e., co-directional or co-rotational). For example, in the embodiments described herein, the plurality of vanes of the cooling orifice 230 may accelerate the air 231 generally along the second direction along the circumferential direction generally co-directional to the high speed turbine rotor 120 and opposite of the low speed turbine rotor 110. However, in various embodiments, the cooling orifice 230 may accelerate the flow of air along the first direction.

Referring now to FIGS. 3-4, as the compressed air 261 pressurizes the space between the outer air bearing 210 and the hub 105, a portion of the compressed air, shown schematically as 262, may egress into the core flowpath 70. Furthermore, as the compressed air 261 pressurizes the space between the first turbine bearing 200 and the hub 105 of the low speed turbine rotor 110, the compressed air 261 is collected in an annular cavity 218 defined by the groove 217 at the outer annular wall 211. Furthermore, as the compressed air 261 pressurizes the space between the first turbine bearing 200 and the HP shaft 34 coupled to the high speed turbine rotor 120, the compressed air 261 is collected in the first cavity 245 defined between the compressor seal interface 240 and the first turbine bearing 200. In various embodiments, the compressed air 261 may further be collected in the second cavity 255 defined between the turbine seal interface 250 and the first turbine bearing 200. The air collected in each cavity 218, 245, 255 may then be collected within the first turbine bearing 200 and egressed through a second manifold 270 as shown schematically by arrows 271. The second manifold 270 is extended from the first turbine bearing 200 to a pressure regulating valve 300 and in fluid communication therebetween.

In various embodiments, the second manifold 270 is in fluid communication with the annular cavity 218 and the first cavity 245. The second manifold 270 may define a flow and pressure of the compressed air 271 therethrough defined by the air from the annular cavity and the first cavity. In another embodiment, the second manifold 270 is further in fluid communication with the second cavity 255. The second manifold 270 may define a flow and pressure of the compressed air 271 therethrough defined by the air from the annular cavity, the first cavity, and the second cavity.

In various embodiments, the engine 10 further includes a third manifold 280 extended from the pressure plenum 84 of the combustion section 26 to the pressure regulating valve 300 and in fluid communication therebetween. In one embodiment, the third manifold 280 communicates a reference pressure or motive pressure to the pressure regulating valve 300. The compressed air 82 in the pressure plenum 84 pressurizes the third manifold 280 as shown schematically by arrows 281.

During operation of the engine 10 shown in FIGS. 1-4, the compressed air 281 from the pressure plenum generally provides a reference pressure to the pressure regulating valve 300 that may generally reflect or correspond to the pressure in pressure plenum 84. The pressure regulating valve 300 generally regulates a difference in pressure between the third manifold 280 and the compressed air 281 within it and the second manifold 270 and the compressed air 271 egressing the first turbine bearing 200. As such, the pressure regulating valve 300 regulates the pressure of air between the hub 105 of the low speed turbine rotor 110 and the outer air bearing 210 as well as the pressure of air between the inner air bearing 220 and the HP shaft 34 coupled to the high speed turbine rotor 120.

Figure 5:
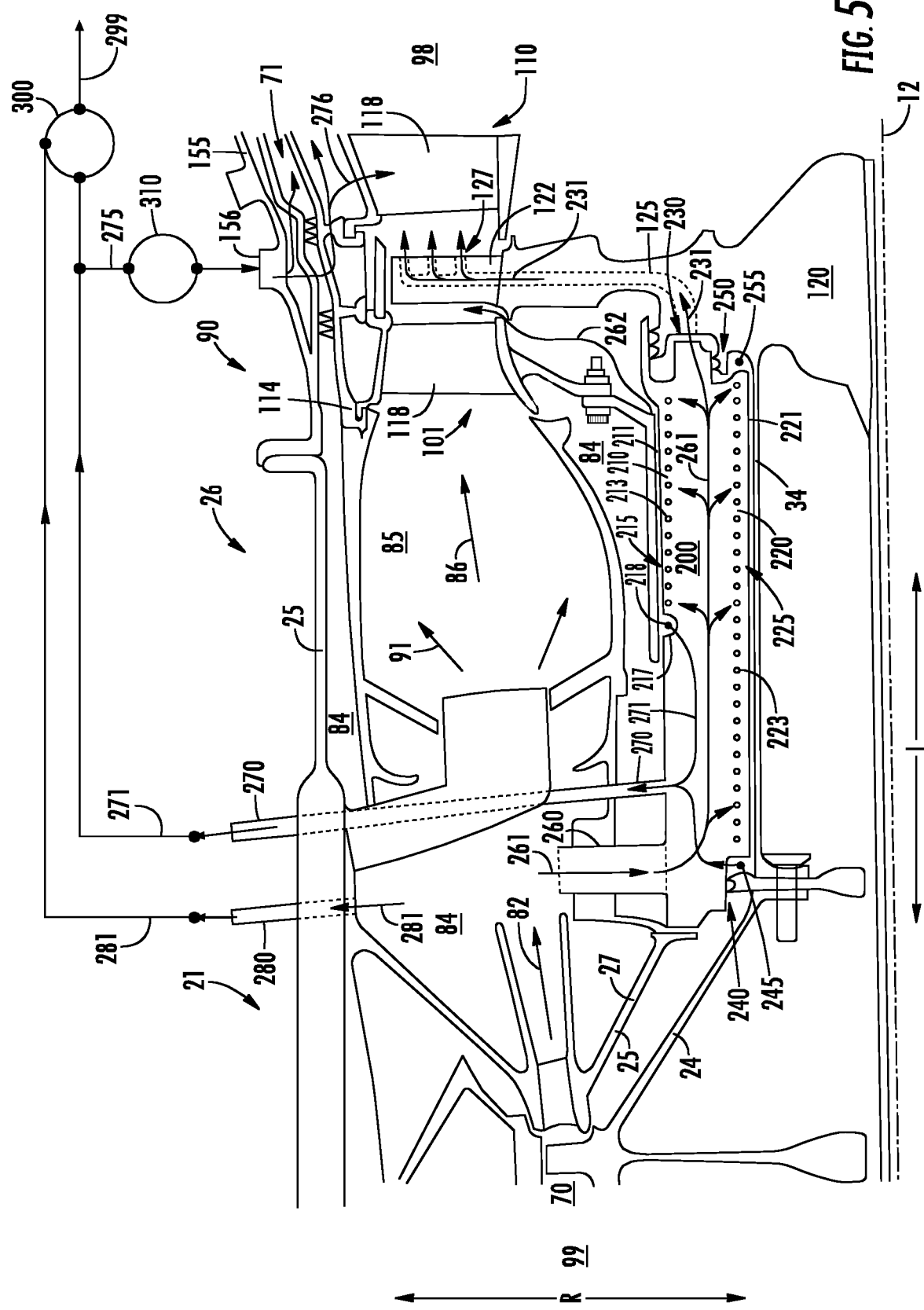
FIG. 5 is a schematic cross sectional view of yet another embodiment of the engine including a first turbine bearing supporting the turbine section shown in FIGS. 1-2.

Referring now to FIG. 5, the engine 10 may be configured substantially similarly to the embodiments shown and described in regard to FIGS. 1-4. In FIG. 5, the engine 10 may further define an OD turbine cooling supply manifold 275 extended from the second manifold 270 and coupled to the OD secondary flowpath 71 of the turbine section 90. In one embodiment, a one way valve 310 is coupled to the turbine cooling supply manifold 275 to enable a flow of the compressed air 271 to the OD secondary flowpath 71 of the turbine section 90. In various embodiments, the one way valve 310 may be referred to as a check valve or non-return valve, enabling a single direction of flow along the second manifold 270 from the first turbine bearing 200.

During operation of the engine 10 shown in FIG. 5, when the pressure in the pressure plenum 84 and, subsequently, the third manifold 280, is low, the pressure regulating valve 300 opens and sends the compressed air, as shown schematically by arrows 299, to a lower pressure sink. In one embodiment, the lower pressure sink includes the core flowpath 70 toward a downstream end 98 of the turbine section 90. In another embodiment, the lower pressure sink includes an ambient area radially outside of the engine 10 (e.g., at approximately ambient or atmospheric pressure condition, such as at approximately 1 bar, or less at altitudes above sea level).

When the pressure regulating valve 300 opens and sends the compressed air 299 to the lower pressure sink, the one way valve 310 generally closes. Conversely, when pressure in the pressure plenum 84 is high, the one way valve 310 generally opens and enables a flow of the compressed air, as shown schematically by arrows 276, into the turbine section 90. The compressed air 276 provides cooling to the interdigitated low speed turbine rotor 110, such as the outer shroud 114 and one or more of the plurality of outer shroud airfoils 118 extended therefrom. The compressed air 276 may additionally, or alternatively, provide buffering at one or more seals within the OD secondary flowpath 271 to restrict a flow of air from higher pressure cavities (e.g., from the combustion section 26 or generally from higher pressures upstream of others within the OD secondary flowpath 271 of the turbine section 90).

When included in an aircraft, the engine 10 may define the pressure in the pressure plenum 84 as low or high based, at least in part, on a landing and take-off (LTO) cycle of the aircraft, such as, but not limited to, those defined by standards, regulations, or requirements from the Federal Aviation Administration or the European Aviation Safety Agency. For example, the LTO as known in the art generally includes taxi, take-off, climb, approach, landing, and taxi. The LTO may further include cruise following take-off and descent following cruise and prior to approach. Generally, the engine 10 defines a high pressure at the pressure plenum 84 at a cruise condition or higher, such as including climb and take-off. The engine 10 defines a low pressure at the pressure plenum 84 below a cruise condition, such as at approach, landing, and taxi. Although various embodiments of the engine 10 may define quantitatively different high and low pressures at the pressure plenum 84, it should be understood that various embodiments of the engine 10 may define qualitatively similar pressures relative to the LTO.

It should be appreciated that although the engine 10 may define the aforementioned LTO during normal operation, deviations in the LTO may define a high pressure in the engine 10 at lower altitudes, such as, but not limited to, altitudes commensurate to approach conditions or lower. For example, the engine 10 may define a high pressure approximately similar to the cruise condition or higher when an aircraft increases power to increase altitude or speed from an approach condition. As used herein, cruise condition includes those abnormal operating conditions that may define pressures, flows, and/or temperatures within the engine 10 generally similar to cruise condition. Still further, although the engine 10 is discussed in regard to within an aircraft, it should be appreciated that similar conditions may be defined in other apparatuses, including, but not limited to, power generation (e.g., industrial, auxiliary power unit, etc.), marine, locomotive, etc.

The first turbine bearing 200 supports the low speed turbine rotor 110 inward of the plurality of outer shroud airfoils 118 at the first stage 101. For example, the first turbine bearing 200 may support the overhung or cantilevered low speed turbine rotor 110 generally forward or upstream 99 of the high speed turbine rotor 120. Still further, the first turbine bearing 200 supports the high speed turbine rotor 120 and the HP shaft 34 coupled to the HP compressor 24.

The arrangement of the first bearing 200 may provide support toward the upstream end 99 of the low speed turbine rotor 110 to be interdigitated forward and/or among the high speed turbine rotor 120. Furthermore, the first bearing 200 provides support toward the upstream end 99 of the low speed turbine rotor 110 that limits an overhanging or cantilevered weight of the low speed turbine rotor 110 from the connecting airfoil 116 upstream toward the combustion section 26. Still further, the first bearing 200 provides support toward the upstream end 99 of the low speed turbine rotor 110 that provides balance to the inner shroud 112 and the plurality of inner shroud airfoils 119 extended therefrom toward the downstream end 98 of the turbine section 90. In various embodiments, the axially extended hub 105 of the low speed turbine rotor 110 may further define one or more balance planes. The balance plane may define features to which weight may be added to or removed from the low speed turbine rotor 110 to aid rotor balance and operation.

Figure 6:
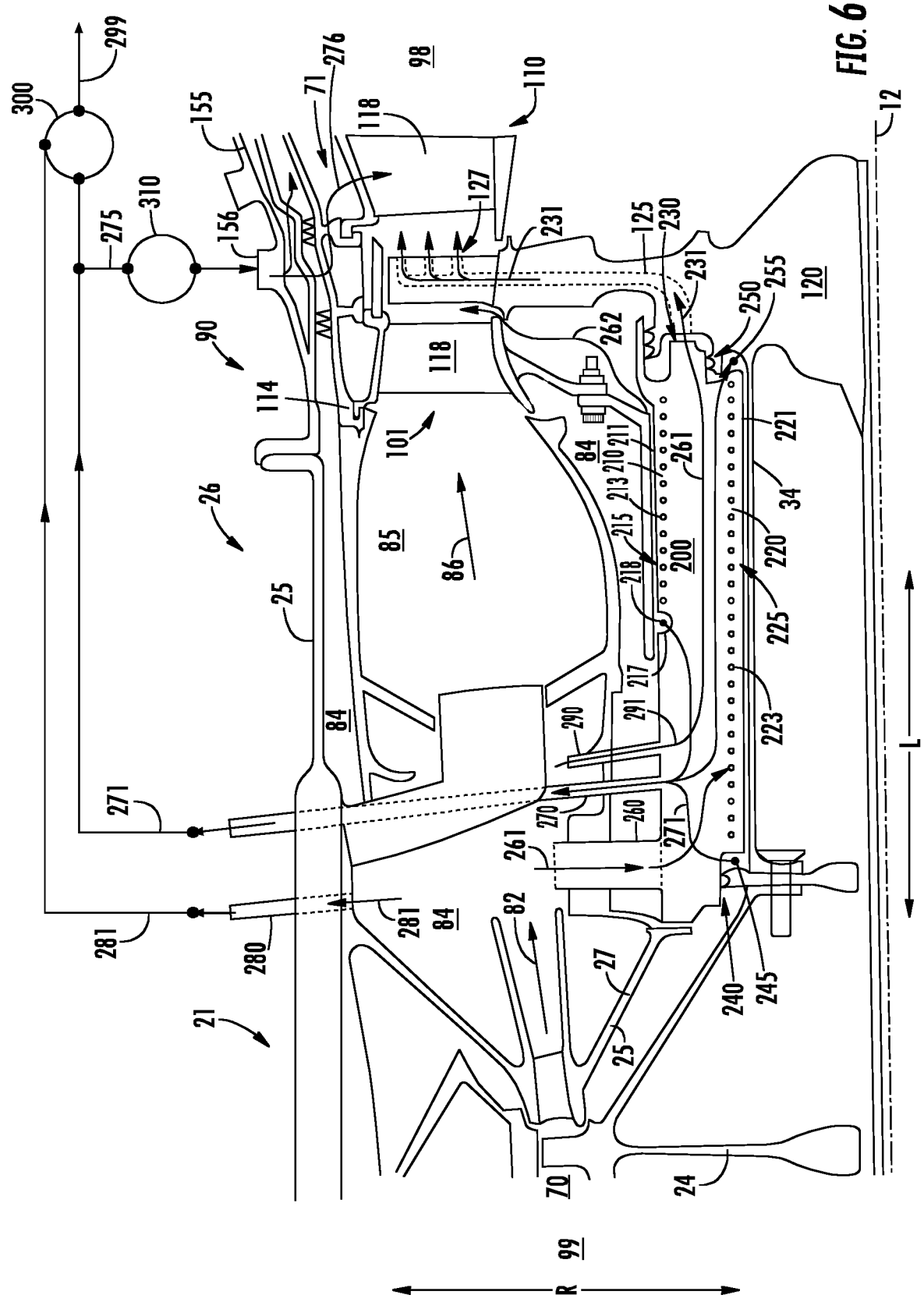
FIG. 6 is a schematic cross sectional view of still another embodiment of the engine including a first turbine bearing supporting the turbine section shown in FIGS. 1-2.

Referring now to FIG. 6, another exemplary embodiment of the engine 10 including the first turbine bearing 200 supporting the low speed turbine rotor 110 and the high speed turbine rotor 120 is generally provided. The exemplary embodiment provided in FIG. 6 may be configured substantially similarly as embodiments shown and described in regard to FIGS. 1-5. However, the embodiment of the engine 10 in FIG. 6 further includes a fourth manifold 290 extended from the pressure plenum 84 and coupled to the first turbine bearing 200. The fourth manifold 290 provides fluid communication of flow and pressure of air from the pressure plenum 84 to the first turbine bearing 200, such as shown schematically by arrows 291, through the first turbine bearing 200 and egressing through the cooling orifice 230. The fourth manifold 290 may collect air from the pressure plenum 84 independently of the first manifold 260 and the compressed air 261 pressurized therethrough to the outer air bearing 210 and the inner air bearing 220. As such, the fourth manifold 290 may define orifices, volumes, or areas, including, but not limited to, restrictor or orifice plates, variable geometry, valves, etc. that may induce a different pressure of compressed air 291 through first turbine bearing 200 through the cooling orifice 230 and egressing into the turbine cooling conduit 125 of the high speed turbine rotor 120 (as shown schematically by arrows 231) than that of the compressed air 261.

In various embodiments, the fourth manifold 290 may extend to a separate external compressed air source (e.g., outside of the pressure plenum 84 or outside of the combustion section 26) to induce a flow and/or pressure independent of the flow or pressure through the pressure plenum 84. The flow and/or pressure of air 291 through the fourth manifold 290 may be actively or passively controlled separately from the air 261 through the first manifold 260 into the first turbine bearing 200. Active control may include one or more of a valve or actuation to open or restrict air 291 to the turbine cooling circuit 125. Passive control may include one or more of a metering or restrictor plate, orifice, or nozzle, conduit, or manifold defining an area of volume sized to provide a desired minimum or maximum flow and/or pressure at one or more engine operating conditions.

Figure 7:
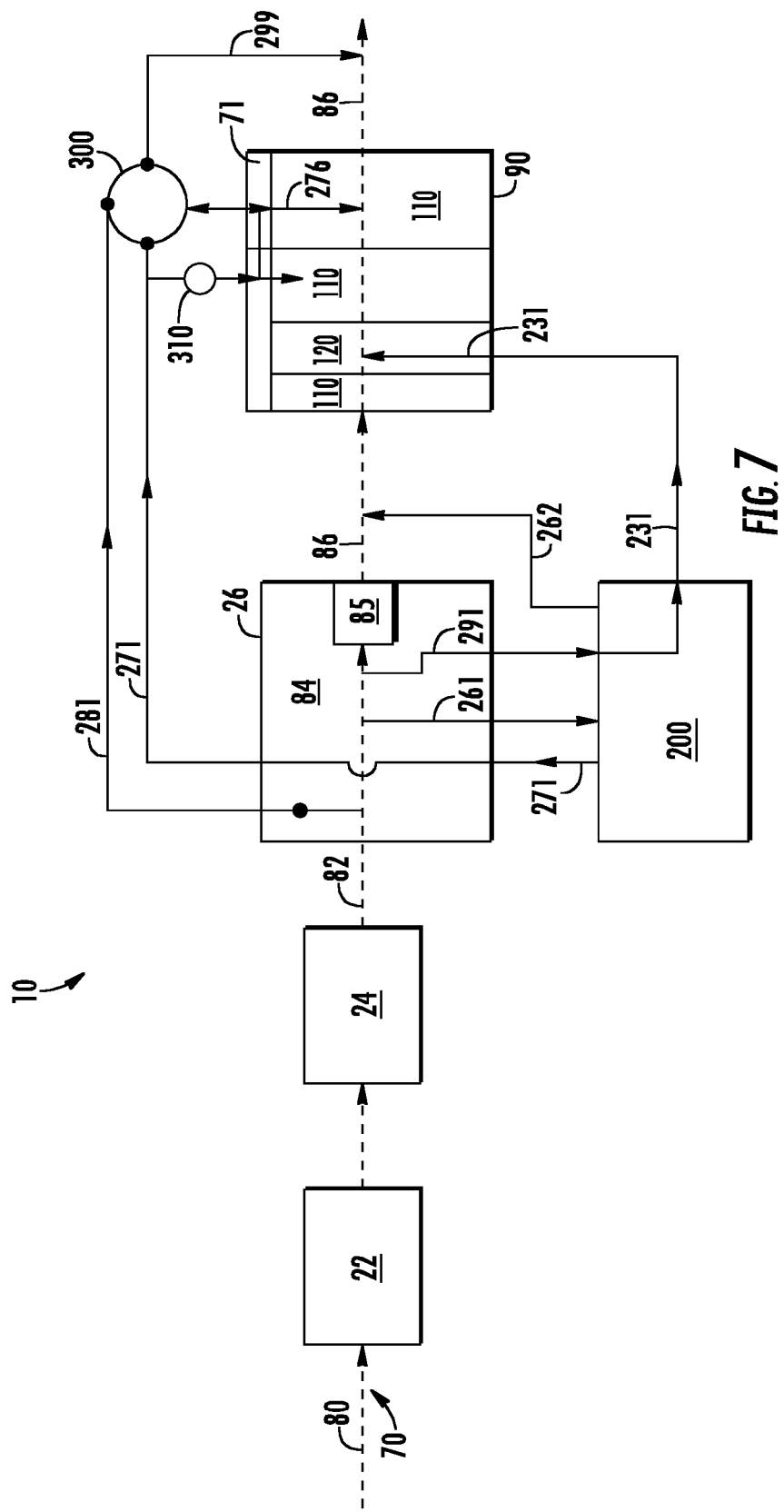
FIG. 7 is a schematic flowchart depicting flows through the engine including a first turbine bearing according to various embodiments shown in FIGS. 1-7.

Referring now to FIG. 7, an exemplary flowchart depicting flows of air and combustion gases through the engine 10 is generally provided. FIG. 7 depicts flows as shown and described in regard to FIGS. 1-6, and various embodiments thereof. However, it should be appreciated that the flowchart may include or omit any one or several embodiments as discussed in regard to each of FIGS. 1-6 or embodiments thereof. FIG. 7 shows an initial flow of air 80 entering the core flowpath 70 of the engine 10. The air 80 enters the IP compressor 22 (or, in two-spool embodiments, the LP compressor) and the HP compressor 24 to become compressed air 82 entering the combustion section 26. A portion of the compressed air 82 egresses from the pressure plenum 84 and enters into the first turbine bearing 200, as shown schematically at arrows 261. As shown and discussed in regard to FIGS. 1-5, the compressed air 261 egresses through the outer plurality of orifices 213 of the outer air bearing 210 and the inner plurality of orifices 223 of the inner air bearing 220, each of which generate a gap or clearance in support of the low speed turbine rotor 110 and the high speed turbine rotor 120, respectively.

As shown and discussed in regard to FIGS. 1-6, the compressed air 261, after egressing from the outer air bearing 210 and inner air bearing 220, is collected in one or more cavities, such as the annular cavity 218, the first cavity 245, and/or the second cavity 255 (FIGS. 1-6), and egressed from the first turbine bearing 200, as shown schematically by arrows 271, to the pressure regulating valve 300.

Referring still to FIG. 7, a portion of compressed air 82 may be egressed from the pressure plenum 84 directly to the pressure regulating valve 300, such as shown schematically by arrows 281. The compressed air 281 provides a reference pressure or motive pressure at the pressure regulating valve 300 in comparison to the input pressure from the compressed air 271 egressing the first turbine bearing 200 and a differential from the air 299 egressing the pressure regulating valve 300 to a lower pressure sink (e.g., such as the core flowpath 70 downstream of the turbine section 90, or an ambient condition).

In various embodiments, such as shown in FIGS. 6-7, compressed air 291 may enter the first turbine bearing 200 and egress into high speed turbine rotor 120, as shown schematically by arrows 231, independently of the compressed air 261 at least partially going through the outer air bearing 210 and inner air bearing 220.

In still various embodiments, at least a portion of air may egress from the first turbine bearing 200 to the core flowpath at or upstream of the turbine section 90, as shown schematically by arrows 262.

Referring still to FIG. 7, a portion of air may egress from the pressure regulating valve 300 into the OD secondary flowpath 71 of the turbine section 90, such as shown schematically by arrows 276. The compressed air 276 may provide cooling to the low speed turbine rotor 110 interdigitated among the high speed turbine rotor 120. In various embodiments, the one way valve 310 is disposed upstream of the OD secondary flowpath 71 and parallel to the flow of compressed air 271 going to the pressure regulating valve 300. The one way valve 310 may restrict a flow of the air 276 toward the OD secondary flowpath 71 and disable flow toward the pressure regulating valve 300.

Figure 8:
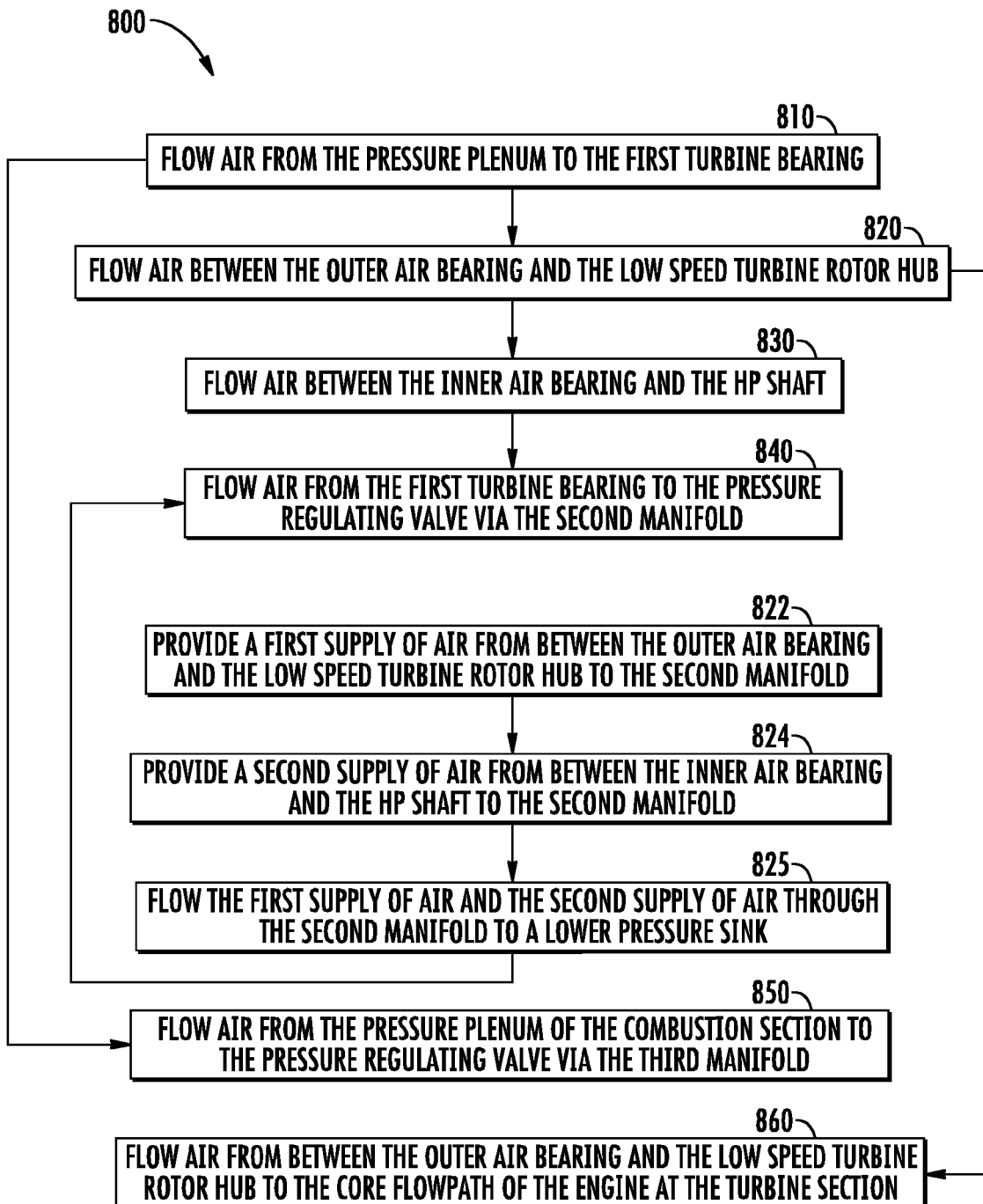
FIG. 8 is an exemplary flowchart outlining a method of operating the gas turbine engine shown and described in regard to FIGS. 1-7.

Referring now to FIG. 8, a flowchart outlining an exemplary method of operating a gas turbine engine 800 is generally provided (hereinafter referred to as "method 800"). The method 800 generally provides an operation of an engine such as that shown in FIGS. 1-7 and described in regard thereto. The engine 10 generally includes a first turbine bearing 200 defining an outer air bearing 210 radially adjacent to a low speed turbine rotor 110 and an inner air bearing 210 radially adjacent to a high speed turbine rotor 120 and an HP shaft 34 coupled thereto. The engine 10 includes a first manifold 260 extended to the first turbine bearing 200 and in fluid communication with a pressure plenum 84 of a combustion section 26 of the engine 10. A second manifold 270 is coupled to the first turbine bearing 200. The second manifold 270 provides fluid communication from the first turbine bearing 200 to the pressure regulating valve 300 or to a lower pressure sink (e.g., an ambient or atmospheric condition outside of the engine, or a lower pressure, such as in the core flowpath proximate to the downstream end of the engine 10). The method 800 outlined in FIG. 8 and described herein may provide operation and support of the interdigitated turbine section 90, such as of the low speed turbine rotor 110 and the high speed turbine rotor 120.

The method 800 includes at 810 flowing air from the pressure plenum to the first turbine bearing; at 820 flowing air between the outer air bearing and the low speed turbine rotor hub; at 830 flowing air between the inner air bearing and the HP shaft; and at 840 flowing air from the first turbine bearing to the pressure regulating valve via the second manifold. Although FIG. 8 depicts steps performed in a particular order for the purposes of illustration and discussion, those of ordinary skill in the art, using the disclosures provided herein, will understand that various steps of any of the methods disclosed herein may be adapted, modified, rearranged, omitted, or expanded in various ways without deviating from the scope of the present disclosure.

In various embodiments of the method 800 outlined in FIG. 8 and described herein, in conjunction with the embodiments of the engine 10 shown in FIGS. 1-7, the step at 810 may include flowing air 261 from the pressure plenum 84 to the first turbine bearing 200 including the outer turbine bearing 210 and the inner turbine bearing 220. At 820, flowing air 261 between the outer air bearing 220 and the hub 105 of the low speed turbine rotor 110 includes defining a pressure of the air 261 between the outer air bearing 220 and the hub 105 such that defines a non-contacting gap or clearance between the first turbine bearing 200 and the hub 105 of the low speed turbine rotor 110. In one embodiment at 830, flowing air between the inner air bearing 220 and the HP shaft 34 defines a pressure of the air 261 such that defines a non-contacting gap or clearance between the first turbine bearing 200 and the HP shaft 34 coupled to the high speed turbine rotor 120. In an embodiment at 840, flowing air 261 from the first turbine bearing 200 to the pressure regulating valve 200 via the second manifold 270 defines a flow and pressure of the air 271 as shown and described in regard to FIGS. 3-7.

In one embodiment, the method 800 further includes at 822 providing a first supply of air from between the outer air bearing and the low speed turbine rotor hub to the second manifold; at 824 providing a second supply of air from between the inner air bearing and the HP shaft to the second manifold; and at 825 flowing the first supply of air and the second supply of air through the second manifold to a lower pressure sink. For example, the method 800 at 822 may include providing air 271 from the annular cavity 218 defined by the groove 217 in the outer air bearing 210, and egressing the air 271 through the first turbine bearing 200 to the second manifold 270. The method 800 at 824 may include providing air 271 from the first cavity 245 through the first turbine bearing 200 to the second manifold 270. The method 800 at 824 may further include providing air 271 from the second cavity 255 through the first turbine bearing 200 to the second manifold 270. The method 800 at 825 may include collecting the air 271 from the annular cavity 218 and the first cavity 245 such that the pressure of the air 271 is normalized, and egressed through the second manifold 270, as shown schematically by arrows 271 in FIGS. 3-7. The method 800 at 825 may further include collecting the air 271 from the annular cavity 218, the first cavity 245, and the second cavity 255, normalizing the pressure, and egressing the air 271 through the second manifold 270.

In one embodiment, the step at 825 includes flowing the first supply of air and the second supply of air through the second manifold 270 to the pressure regulating valve 300. In still various embodiments, the step at 825 may include flowing the first supply of air and the second supply of air through the second manifold to a lower pressure sink. For example, the lower pressure sink may be an ambient or atmospheric pressure condition outside of the engine 10 or toward a downstream end 98 of the core flowpath 70 of the turbine section 90. In various examples, the lower pressure sink generally defines a pressure less than within the pressure plenum 84, the first turbine bearing 200, or the second manifold 270. In one embodiment, the lower pressure sink is approximately 1 bar or less.

In one embodiment of the method 800, the method 800 further includes at 850 flowing air from the pressure plenum of the combustion section to the pressure regulating valve via the third manifold. For example, the method 800, such as implemented in conjunction with the engine 10 shown in FIGS. 1-7, may include flowing or communicating to the pressure regulating valve 300 the pressure within the pressure plenum 84 via the third manifold 280, such as shown via the compressed air 281 from the pressure plenum 84 to the pressure regulating valve 300.

In another embodiment, the method 800 further includes at 860 flowing air from between the outer air bearing and the low speed turbine rotor hub to the core flowpath of the engine at the turbine section. For example, referring to FIGS. 1-7, the method 800 at 860 includes directing a flow of air 262 from the outer plurality of orifices 213 of the outer air bearing 210 to the core flowpath 70 at the turbine section 90 of the engine 10.

Figure 9:
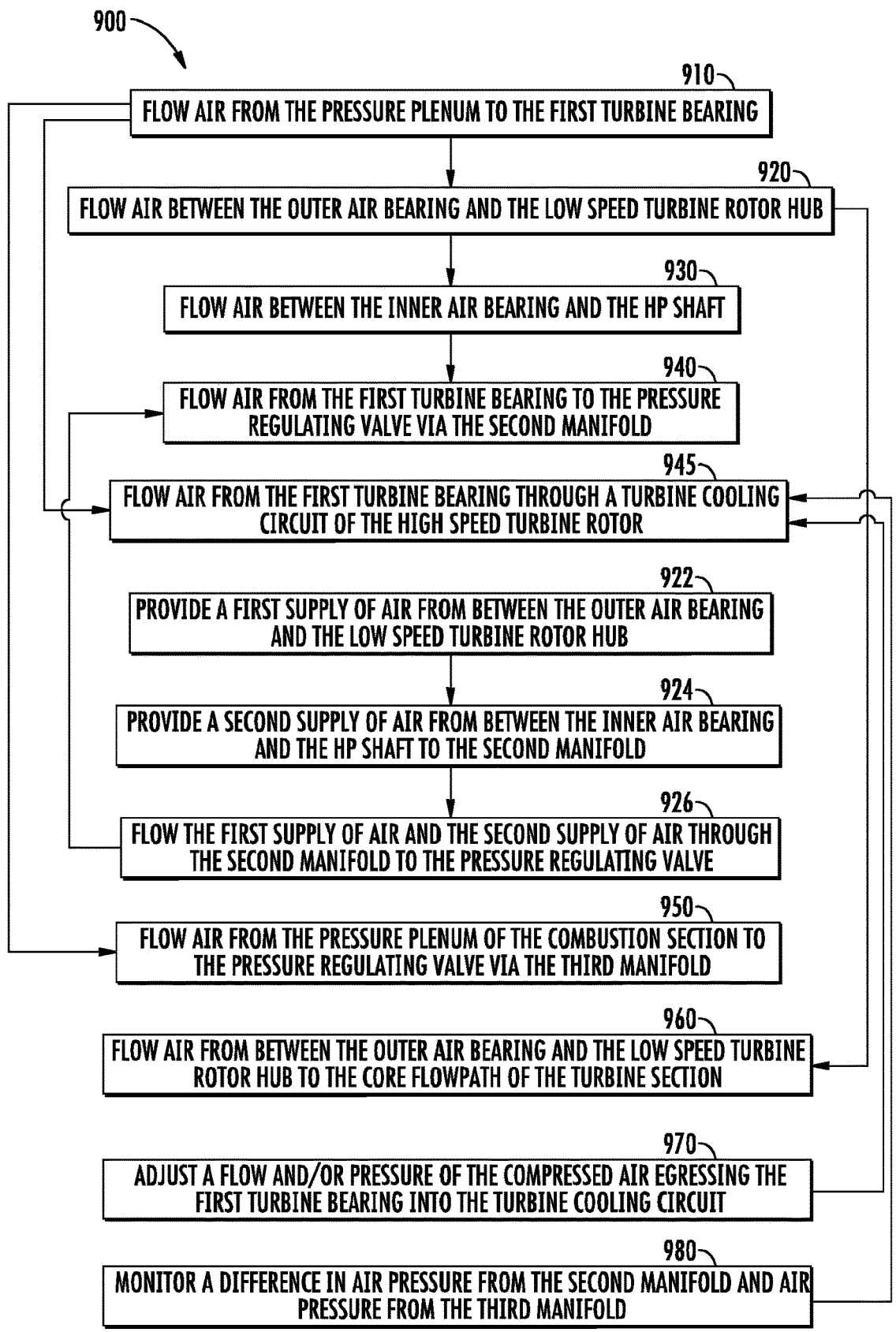
FIG. 9 is an exemplary flowchart outlining a method of turbine section thermal management for the gas turbine engine shown and described in regard to FIGS. 1-7.

Referring now to FIG. 9, a flowchart outlining an exemplary method of operating a gas turbine engine 900 is generally provided (hereinafter referred to as "method 900"). The method 900 generally provides an operation of an engine such as that shown in FIGS. 1-7 and described in regard thereto. The method 900 may further include one or more steps outlined and described in regard to method 800 outlined and described in regard to FIG. 8. The engine 10 generally includes a first turbine bearing 200 defining an outer air bearing 210 radially adjacent to a low speed turbine rotor 110 and an inner air bearing 210 radially adjacent to a high speed turbine rotor 120 and an HP shaft 34 coupled thereto. The engine 10 includes a first manifold 260 extended to the first turbine bearing 200 and in fluid communication with a pressure plenum 84 of a combustion section 26 of the engine 10. A second manifold 270 is coupled to the first turbine bearing 200. A third manifold 280 is coupled to the combustion section 26 and provides fluid communication from the pressure plenum 84 to a pressure regulating valve 300. The second manifold 270 provides fluid communication from the first turbine bearing 200 to the pressure regulating valve 300. The method 900 outlined in FIG. 9 and described herein may provide operation and support of the interdigitated turbine section 90, such as of the low speed turbine rotor 110 and the high speed turbine rotor 120, while also providing thermal attenuation at the high speed turbine rotor 120.

The method 900 may include at 910 flowing air from the pressure plenum to the first turbine bearing; at 920 flowing air between the outer air bearing and the low speed turbine rotor hub; at 930 flowing air between the inner air bearing and the HP shaft; at 940 flowing air from the first turbine bearing to the pressure regulating valve via the second manifold; and at 945 flowing air from the first turbine bearing through a turbine cooling circuit of the high speed turbine rotor. The steps at 910, 920, 930, and 940, and various embodiments thereof, may be undertaken as described in regard to the steps at 810, 820, 830, and 840, respectively, and in various embodiments thereof.

In various embodiments, such as in regard to FIGS. 4-6, the step at 945 includes egressing the flow of air 231 from the first turbine bearing 200 through the cooling orifice 230 into the turbine cooling conduit 125 of the high speed turbine rotor 120. For example, in one embodiment, in reference to the engine 10 shown and described in regard to FIGS. 4-5, the first turbine bearing 200 defines a conduit there through to provide compressed air 261 from the first manifold 260 and pressure plenum 84 and egressing through the cooling orifice 230 adjacent to the turbine cooling circuit 125 of the high speed turbine rotor 120, as depicted schematically by arrows 231.

In one embodiment, the method 900 includes at 950 flowing air from the pressure plenum of the combustion section to the pressure regulating valve via the third manifold, such as described in regard to step 850 of method 800 and shown and described in regard to FIGS. 1-7.

In another embodiment, the method 900 includes at 960 flowing air from between the outer air bearing and the low speed turbine rotor hub to the core flowpath of the turbine section, such as described in regard to step 860 of method 800 and shown and described in regard to FIGS. 1-8.

In still another embodiment, flowing air to the turbine cooling circuit 125 of the high speed turbine rotor 120 includes at 970 modulating or adjusting a flow and/or pressure of the compressed air 231 egressing the first turbine bearing 200 into the turbine cooling circuit 125. For example, referring to FIGS. 6-7, modulating or adjusting a flow and/or pressure of compressed air 231 may include flowing air from the fourth manifold 290 independently of the first manifold 260.

In still another embodiment, the method 900 may further include at 980 monitoring a difference in air pressure from the second manifold and air pressure from the third manifold. For example, monitoring the difference in air pressure includes a difference between the compressed air 271 in the second manifold 270 and the compressed air 281 in the third manifold 280. The compressed air 281, or more specifically, the pressure of the compressed air 281 provides to the pressure regulating valve 300 a reference pressure or muscle air for operating the pressure regulating valve 300 to maintain a desired pressure of the compressed air 261 at the first turbine bearing 200 for maintaining a desired gap or clearance between the first turbine bearing 200 and each of the hub 105 and HP shaft 34.

In various embodiments, the method 900 may include at 922 providing a first supply of air from between the outer air bearing and the low speed turbine rotor hub; at 924 providing a second supply of air from between the inner air bearing and the HP shaft; and at 926 flowing the first supply of air and the second supply of air through the second manifold to the pressure regulating valve. The steps at 922 and 924 may be performed substantially similarly as described in regard to steps 822 and 824 of method 800.

The method 900 at 926 may include collecting the air 271 from the annular cavity 218 and the first cavity 245 such that the pressure of the air 271 is normalized, and egressed through the second manifold 270, as shown schematically by arrows 271 in FIGS. 3-7. The method 900 at 926 may further include collecting the air 271 from the annular cavity 218, the first cavity 245, and the second cavity 255, normalizing the pressure, and egressing the air 271 through the second manifold 270. For example, in one embodiment, the step at 926 includes flowing the first supply of air and the second supply of air through the second manifold 270 to the pressure regulating valve 300.

Figure 10:
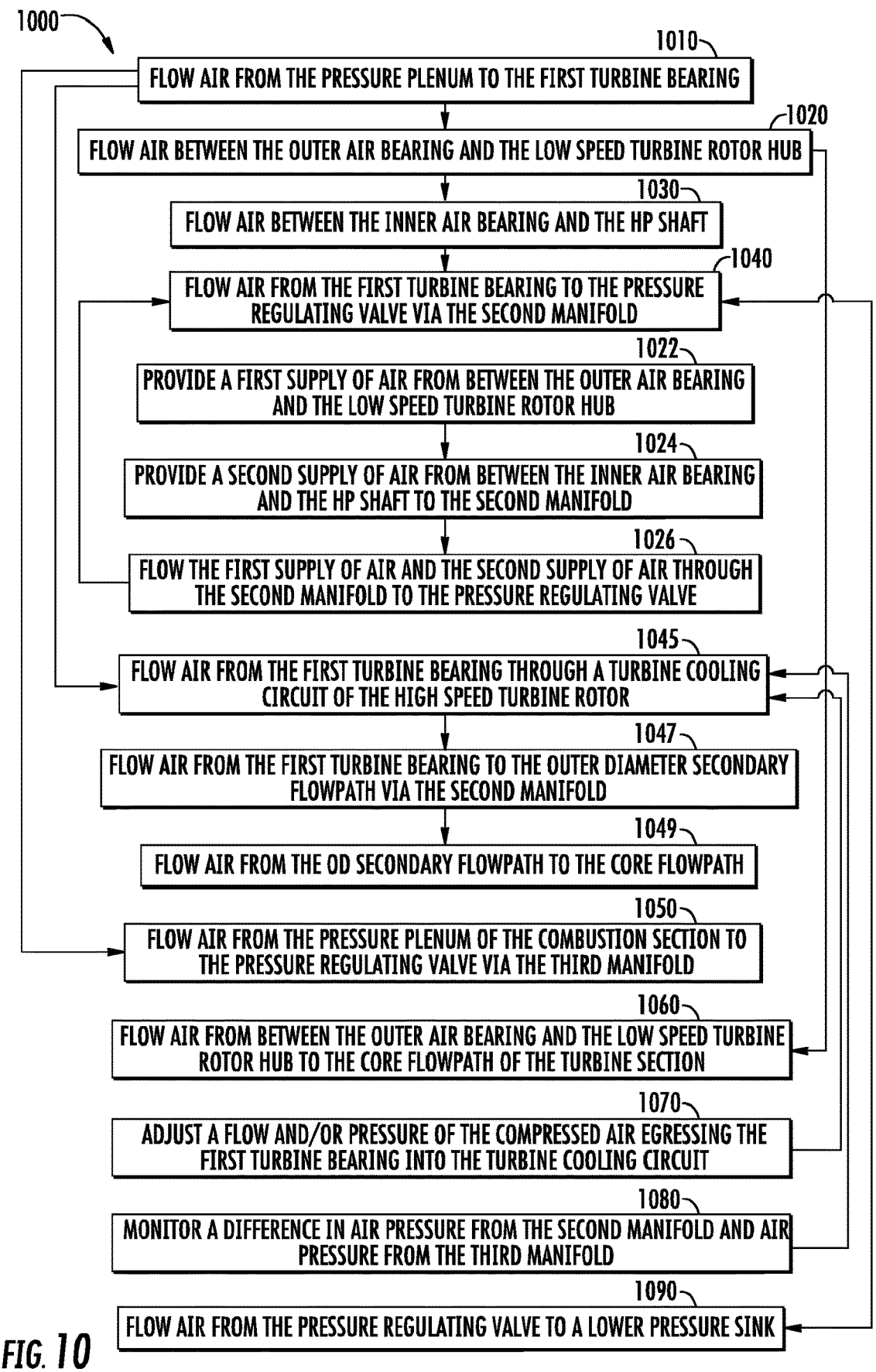
FIG. 10 is an exemplary flowchart outlining another method of turbine section thermal management for the gas turbine engine shown and described in regard to FIGS. 1-7.

Referring now to FIG. 10, a flowchart outlining an exemplary method of thermal management a gas turbine engine 1000 is generally provided (hereinafter referred to as "method 1000"). The method 1000 may provide thermal attenuation of the low speed turbine rotor 110 of the interdigitated turbine section 90 such as shown and described in regard to FIGS. 1-7. The method 1000 may further include one or more steps of the method 800 and/or method 900 and outlined and described in regard to FIGS. 8-9.

The method 1000 may include at 1010 flowing air from the pressure plenum to the first turbine bearing; at 1020 flowing air between the outer air bearing and the low speed turbine rotor hub; at 1030 flowing air between the inner air bearing and the HP shaft; and at 1040 flowing air from the first turbine bearing to the pressure regulating valve via the second manifold. The steps at 1010, 1020, 1030, and 1040, and various embodiments thereof, may be undertaken as described in regard to the steps at 810, 820, 830, and 840, respectively, and in various embodiments thereof.

The method 1000 further includes at 1047 flowing air from the first turbine bearing to the outer diameter (OD) secondary flowpath via the second manifold. For example, the method 1000 at 1047 may include flowing compressed air 271 from the second manifold 270 through the turbine cooling supply manifold 275 coupled to the outer turbine casing 155 and in fluid communication with the OD secondary flowpath 71, such as shown schematically by arrows 276 in FIG. 5.

In one embodiment of the method 1000 at 1047, flowing air 276 through the OD secondary flowpath 71 may include opening a one way valve (e.g., one way valve 310), such as by defining a pressure of the air 271 in the second manifold 270 that overcomes the one way valve 310 at the turbine cooling supply manifold 275. In various embodiments, the method 1000 at 1047 may include operating the engine 10 at a cruise power condition or higher of the LTO.

In one embodiment, the method 1000 may further includes at 1049 flowing air from the OD secondary flowpath to the core flowpath. For example, in regard to FIG. 5, compressed air, shown schematically by arrows 276, flows from the turbine cooling supply manifold 275 through the OD secondary flowpath 71 into the core flowpath 70. More specifically, the compressed air 276 flows proximate to the outer shroud 114 and the outer shroud airfoils 118 of the low speed turbine rotor 110 to provide cooling. In various embodiments, the compressed air 276 may further flow toward the downstream end 98 within the OD secondary flowpath 71 to further provide cooling along the low speed turbine 110.

In another embodiment, the method 1000 may further include at 1090 flowing air from the pressure regulating valve to a lower pressure sink. For example, referring to FIG. 5, the method 1000 at 1090 may include flowing air 299 from the pressure regulating valve 300 to the core flowpath 70 at the downstream end 98 of the turbine section 90 (e.g., proximate to the inner shroud airfoils 119 of the low speed turbine rotor 110). As another example, the method 1000 at 1090 may include flowing air 299 to an ambient condition outside of the core flowpath 70. In various embodiments, the method 1000 at 1090 includes operating the engine 10 below a cruise power condition (e.g., approach, landing, taxi, or generally at low pressure/low altitude conditions).

In various embodiments, the method 1000 may further includes steps shown and described in regard to method 800 and method 900, such as, the steps 822, 824, 926, 945, 850,

860, 970, or 980 commensurate to steps 1022, 1024, 1026, 1045, 1050, 1060, 1070, or 1080 herein.

The turbine section 90 shown and described herein may improve upon existing turbine sections by providing improved fuel efficiency, operational efficiency, and/or power output while maintaining or reducing weight, part count, and/or packaging. The plurality of outer shroud airfoils 118 of the low speed turbine rotor 110 interdigitated among the plurality of high speed turbine airfoils 122 of the high speed turbine rotor 120 may reduce packaging and reduce part count by removing stages of stationary airfoils between each rotating component. Additionally, the turbine section 90 may provide efficiency benefits comparable to a reduction gearbox without adding weight or size (e.g. axial length) to the engine 10. The low speed turbine rotor 110, as the first stage downstream of the combustion section 26, may further improve engine efficiency by reducing cooling air appropriated away from producing combustion gases 86, thereby allowing more energy from the compressor section 21 to be used in combustion and operation of the engine 10. Furthermore, removing the nozzle guide vane between the combustion section 26 and the low speed turbine rotor 110 of the turbine section 90 may reduce or eliminate design constraints related to hot spots in the combustion gases along the annulus of the core flowpath 70.

The various embodiments of the turbine section 90 generally shown and described herein may be constructed as individual blades installed into drums or hubs, or integrally bladed rotors (IBRs) or bladed disks, or combinations thereof. The blades, hubs, or bladed disks may be formed of ceramic matrix composite (CMC) materials and/or metals appropriate for gas turbine engine hot sections, such as, but not limited to, nickel-based alloys, cobalt-based alloys, iron-based alloys, or titanium-based alloys, each of which may include, but are not limited to, chromium, cobalt, tungsten, tantalum, molybdenum, and/or rhenium. The turbine section 90, or portions or combinations of portions thereof, including the inner shroud 112, the outer shroud 114, the connecting airfoil(s) 116, the plurality of outer shroud airfoils 118, and/or the plurality of inner shroud airfoils 119, may be formed using additive manufacturing or 3D printing, or casting, forging, machining, or castings formed of 3D printed molds, or combinations thereof. The turbine section 90, or portions thereof, such as stages of the rotating components 110, 120, 130, the outer shroud 114, the inner shroud 112, and/or various shrouds, seals, and other details may be mechanically joined using fasteners, such as nuts, bolts, screws, pins, or rivets, or using joining methods, such as welding, brazing, bonding, friction or diffusion bonding, etc., or combinations of fasteners and/or joining methods. Still further, it should be understood that the low speed turbine rotor 110, including the inner and/or outer shroud 112, 114, may incorporate features that allow for differential expansion. Such features include, but are not limited to, aforementioned methods of manufacture, various shrouds, seals, materials, and/or combinations thereof.

The systems and methods shown in FIGS. 1-10 and described herein may decrease fuel consumption, increase operability, increase engine performance and/or power output while maintaining or reducing weight, part count, and/or packaging (e.g. radial and/or axial dimensions). The systems provided herein may allow for increased high bypass ratios and/or overall pressure ratios over existing gas turbine engine configurations, such as turbofans, while maintaining or reducing packaging relative to other gas turbine engines of similar power output. The systems described herein may contribute to improved bypass ratio and/or overall pressure ratio and thereby increase overall gas turbine engine efficiency. The systems provided herein may increase overall gas turbine engine efficiency by reducing or eliminating stationary airfoils that require cooling air (e.g. nozzle guide vane).

Still further, the systems and methods shown in FIGS. 1-10 and described herein may reduce a product of a flow area and the square of the rotational speed (the product herein referred to as "$AN^2$") of the gas turbine engine. For example, engine 10 shown and described in regard to FIGS. 1-10 may generally reduce $AN^2$ relative to a conventional geared turbofan configuration. Generally, lowering the $AN^2$, such as by reducing the rotational speed and/or the flow area, increases the required average stage work factor (i.e. the average required loading on each stage of rotating airfoils). However, the systems described herein may lower the $AN^2$ while also lowering the average stage work factor and maintaining axial length of the turbine section 90 (compared to engines of similar thrust output and packaging) by interdigitating the low speed turbine rotor 110 among the one or more stages of the high speed turbine rotor 120 and the intermediate speed turbine 130 while also defining a non-digitated turbine structure (i.e. the inner shroud 112 and the plurality of inner shroud airfoils 119) toward the downstream end 98 of the turbine section 90. Therefore, the low speed turbine rotor 110 may increase the quantity of rotating stages of airfoils while reducing the average stage work factor, and therefore the $AN^2$, while mitigating increases in axial length to produce a similar $AN^2$ value. The low speed turbine rotor 110 may further reduce the $AN^2$ while additionally reducing the overall quantity of airfoils, rotating and stationary, in the turbine section 90 relative to turbine sections of gas turbine engines of similar power output and/or packaging.

Furthermore, the systems and methods shown in FIGS. 1-10 and described herein may further improve engine efficiency, reduce airfoil quantity, reduce engine weight, and/or alleviate combustion section design constraints by interdigitating the low speed turbine rotor 110 forward or upstream 99 of the high speed turbine rotor 120. For example, defining the first stage of the low speed turbine rotor 110 as immediately downstream 98 of the combustion section 26, without a first turbine vane or nozzle guide vane therebetween, as well as defining the low speed turbine rotor 110 in counter-rotation with the high speed turbine rotor 120, may reduce effects of overall combustion hot spots on the first stage of the low speed turbine rotor 110 in contrast to a stationary, first turbine vane or nozzle guide vane. As such, the turbine section 90 and engine 10 described herein may remove constraints to combustion section 26 design by de-emphasizing hot spots, or combustion pattern factor, in favor of other design criteria, such as decreasing emissions, improving lean blow-out (LBO) and/or altitude re-light, improving overall operability across part or all of an operating envelope, or increasing the operating envelope.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a longitudinal direction, a radial direction extended from an axial centerline, and a circumferential direction, the gas turbine engine comprising:
   a first turbine rotor comprising a hub extended along the longitudinal direction;
   a second turbine rotor comprising a shaft coupling the second turbine rotor to a compressor rotor, wherein the shaft is extended along the longitudinal direction and is radially inward of the hub of the first turbine rotor, and wherein the second turbine rotor comprises a turbine cooling conduit extended within the second turbine rotor; and
   a turbine bearing assembly positioned between the hub of the first turbine rotor and the shaft, wherein the turbine bearing assembly comprises an outer air bearing at an outer diameter of the turbine bearing assembly, and wherein the outer air bearing is adjacent to the hub of the first turbine rotor, and wherein the turbine bearing assembly comprises an inner air bearing along an inner diameter of the turbine bearing assembly, and wherein the inner air bearing is adjacent to the shaft, and further wherein the turbine bearing assembly comprises a cooling orifice adjacent to the turbine cooling conduit of the second turbine rotor, and wherein the cooling orifice at the turbine bearing assembly and the turbine cooling conduit at the second turbine rotor are in fluid communication.

2. The gas turbine engine of claim 1, wherein the cooling orifice comprises a nozzle configured to accelerate a flow of air from the turbine bearing assembly to the turbine cooling conduit of the second turbine rotor.

3. The gas turbine engine of claim 1, wherein the cooling orifice comprises a plurality of vanes configured to accelerate a flow of air along the longitudinal and circumferential directions, wherein acceleration of the flow of air along the circumferential direction is along the same direction of rotation as the second turbine rotor.

4. The gas turbine engine of claim 1, the gas turbine engine comprising:
   a combustion section;
   a compressor section, wherein one or both of the combustion section or the compressor section forms a pressure plenum; and
   a first manifold connected to the turbine bearing assembly, wherein the first manifold is extended from the pressure plenum to the turbine bearing assembly, and wherein the first manifold provides fluid communication between the pressure plenum and the turbine bearing assembly.

5. The gas turbine engine of claim 4, the gas turbine engine comprising:
   a second manifold extended from the turbine bearing assembly in fluid communication with a pressure regulating valve.

6. The gas turbine engine of claim 5, the gas turbine engine comprising:
   a third manifold extended from the pressure plenum to the pressure regulating valve, wherein the pressure plenum and the pressure regulating valve are in fluid communication via the third manifold.

7. The gas turbine engine of claim 4, the gas turbine engine comprising:
   a pressure plenum manifold extended from the pressure plenum to the turbine bearing assembly, the pressure plenum manifold independently operable from the first manifold.

8. The gas turbine engine of claim 7, wherein the pressure plenum manifold, the cooling orifice, and the turbine cooling conduit are together in fluid communication.

9. The gas turbine engine of claim 1, wherein the turbine bearing assembly comprises an outer plurality of orifices positioned at the outer air bearing, and wherein the outer plurality of orifices is adjacent to the hub of the first turbine rotor, and wherein the turbine bearing assembly comprises an inner plurality of orifices positioned at the inner air bearing, and wherein the inner plurality of orifices is adjacent to the second turbine rotor.

10. The gas turbine engine of claim 1, wherein the turbine bearing assembly comprises an at least partially annular groove at the outer diameter of the turbine bearing assembly, and wherein the groove is radially adjacent to the hub of the first turbine rotor.

11. The gas turbine engine of claim 1, wherein the gas turbine engine defines a compressor seal interface between a compressor and the turbine bearing assembly, and wherein the gas turbine engine forms a first cavity between the compressor seal interface and the turbine bearing assembly.

12. The gas turbine engine of claim 1, wherein the gas turbine engine defines a turbine seal interface between the second turbine rotor and the turbine bearing assembly, and wherein the gas turbine engine forms a second cavity between the second turbine rotor and the turbine bearing assembly.

13. The gas turbine engine of claim 1, wherein the first turbine rotor is interdigitated with the second turbine rotor, and wherein the first turbine rotor is operable at a first maximum rotational speed less than the second turbine rotor operable at a second maximum rotational speed, and wherein the first turbine rotor comprises at least one stage upstream of the second turbine rotor.

14. The gas turbine engine of claim 13, wherein the first turbine rotor is immediately downstream of a combustion section.

15. The gas turbine engine of claim 1, the gas turbine engine comprising:
   a combustion section;
   a compressor section; and
   a manifold connected to the turbine bearing assembly, wherein the manifold is configured to provide a flow of air from a pressure plenum at one of the combustion section or the compressor section through the cooling orifice at the turbine bearing assembly and to the turbine cooling conduit at the second turbine rotor.

16. The gas turbine engine of claim 1, wherein the second turbine rotor comprises a cooling circuit egress in fluid communication with the turbine cooling conduit and a core flowpath at a turbine section of the gas turbine engine.

17. The gas turbine engine of claim 1, the gas turbine engine comprising:
   a combustion section;
   a compressor section;
   a first manifold extended from a pressure plenum at one of the combustion section or the compressor section, wherein the first manifold is connected to the turbine bearing assembly, and wherein the first manifold provides a flow of air from the pressure plenum to the turbine bearing assembly;
   a second manifold extended from the turbine bearing assembly in fluid communication with a pressure regulating valve, wherein the second manifold provides fluid communication between the pressure regulating valve and a first cavity formed between a compressor seal interface and the turbine bearing assembly; and a third manifold extended in fluid communication from the pressure plenum to the pressure regulating valve, wherein the third manifold provides a motive pressure at the pressure regulating valve.

18. The gas turbine engine of claim 17, wherein the turbine bearing assembly comprises:
   an outer plurality of orifices at the outer air bearing of the turbine bearing assembly, wherein the outer plurality of orifices provides fluid communication of the flow of air from the first manifold to a first volume between the hub of the first turbine rotor and the turbine bearing assembly;
   an inner plurality of orifices at the inner air bearing of the turbine bearing assembly, wherein the inner plurality of orifices provides fluid communication of the flow of air from the first manifold to a second volume between the shaft of the second turbine rotor and the turbine bearing assembly; and
   wherein the second manifold is configured to provide the flow of air from each of the first volume and the second volume to the pressure regulating valve.

19. The gas turbine engine of claim 17, the gas turbine engine comprising:
   a check valve, wherein the check valve and the pressure regulating valve are together in parallel arrangement relative to the second manifold, and wherein the second manifold is in fluid communication with the check valve and the pressure regulating valve.

20. The gas turbine engine of claim 19, the gas turbine engine comprising:
   a turbine casing defining a secondary flowpath positioned between a rotatable outer shroud of the first turbine rotor and the turbine casing; and
   a turbine cooling supply manifold connected in fluid communication to the second manifold, wherein the turbine cooling supply manifold is configured to provide fluid communication between the second manifold and the secondary flowpath, and wherein the check valve is positioned fluidly between the second manifold and the secondary flowpath.

* * * * *